(12) United States Patent
Candelore et al.

(10) Patent No.: US 11,211,073 B2
(45) Date of Patent: Dec. 28, 2021

(54) DISPLAY CONTROL OF DIFFERENT VERBATIM TEXT OF VOCAL DELIVERANCE OF PERFORMER-OF-INTEREST IN A LIVE EVENT

(71) Applicant: SONY CORPORATION, Tokyo (JP)

(72) Inventors: Brant Candelore, San Diego, CA (US); Mahyar Nejat, San Diego, CA (US); Peter Shintani, San Diego, CA (US); Robert Blanchard, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 407 days.

(21) Appl. No.: 16/390,183

(22) Filed: Apr. 22, 2019

(65) Prior Publication Data
US 2020/0335120 A1 Oct. 22, 2020

(51) Int. Cl.
| | |
|---|---|
| *G10L 15/26* | (2006.01) |
| *G10L 21/10* | (2013.01) |
| *G06F 3/0482* | (2013.01) |
| *G10L 15/22* | (2006.01) |
| *G10L 15/18* | (2013.01) |
| *H04N 21/218* | (2011.01) |

(Continued)

(52) U.S. Cl.
CPC ............ *G10L 15/26* (2013.01); *G06F 3/0482* (2013.01); *G10L 15/1822* (2013.01); *G10L 15/22* (2013.01); *G10L 21/10* (2013.01); *H04N 5/247* (2013.01); *H04N 21/21805* (2013.01); *H04N 21/233* (2013.01); *H04N 21/23418* (2013.01); *H04N 21/4728* (2013.01); *H04N 21/4884* (2013.01)

(58) Field of Classification Search
CPC ..... G10L 15/26; G10L 15/1822; G10L 21/10; G10L 15/22; H04N 5/247; H04N 21/233; H04N 21/21805; H04N 21/23418; H04N 21/4728; H04N 21/4884; G06F 3/0482
USPC ........................................................ 704/235
See application file for complete search history.

(56) References Cited

U.S. PATENT DOCUMENTS

| | | | |
|---|---|---|---|
| 8,014,765 B2 | 9/2011 | Pettinato | |
| 9,558,749 B1 * | 1/2017 | Secker-Walker | ....... G10L 17/06 |

(Continued)

FOREIGN PATENT DOCUMENTS

CN 106488264 A 3/2017

*Primary Examiner* — Edwin S Leland, III
(74) *Attorney, Agent, or Firm* — Chip Law Group

(57) ABSTRACT

A display system includes a display device and a server. The server receives a plurality of audio segments from a plurality of audio-capture devices. The server receives a user-input that corresponds to a selection of a first user interface (UI) element that represents a first performer-of-interest or a first audio-capture device attached to the first performer-of-interest. The server detects a second performer-of-interest associated with a second audio-capture device within a threshold range of the first audio-capture device. The server extracts a first audio segment of a first vocal deliverance of the first performer-of-interest and a second audio segment of a second vocal deliverance of the second performer-of-interest. The server deduces new caption information from a first verbatim text that is common between the first audio segment and the second audio segment and controls display of the new caption information on the display device.

20 Claims, 7 Drawing Sheets

(51) Int. Cl.
  *H04N 21/234*   (2011.01)
  *H04N 21/4728*  (2011.01)
  *H04N 21/488*   (2011.01)
  *H04N 21/233*   (2011.01)
  *H04N 5/247*    (2006.01)

(56) References Cited

U.S. PATENT DOCUMENTS

| | | | |
|---|---|---|---|
| 9,646,603 B2* | 5/2017 | Kadirkamanathan | G10L 15/02 |
| 2005/0210516 A1* | 9/2005 | Pettinato | H04N 21/41407 |
| | | | 725/81 |
| 2011/0035219 A1* | 2/2011 | Kadirkamanathan | |
| | | | G10L 15/005 |
| | | | 704/239 |
| 2014/0039871 A1* | 2/2014 | Crawford | G06F 40/103 |
| | | | 704/2 |
| 2019/0108494 A1* | 4/2019 | Nelson | H04L 12/1831 |
| 2019/0273767 A1* | 9/2019 | Nelson | H04L 65/403 |
| 2019/0387263 A1* | 12/2019 | Xu | H04N 21/83 |
| 2020/0278828 A1* | 9/2020 | Murtaza | G02B 27/0179 |
| 2020/0335120 A1* | 10/2020 | Candelore | G06F 3/0482 |

\* cited by examiner

DISPLAY CONTROL OF DIFFERENT VERBATIM TEXT OF VOCAL DELIVERANCE OF PERFORMER-OF-INTEREST IN A LIVE EVENT

CROSS-REFERENCE TO RELATED APPLICATIONS/INCORPORATION BY REFERENCE

None.

FIELD

Various embodiments of the disclosure relate to audio and video presentation technologies. More specifically, various embodiments of the disclosure relate to display control of different verbatim text of a vocal deliverance of a performer-of-interest in a live event.

BACKGROUND

Advancements in the field of audio and video presentation technologies has led to an increase in use of display panels for the display of subtitles or closed captions over videos in live events. These subtitles may be a transcription, transliteration, or a translation of a dialogue or a phrase spoken in one or more languages for a specific audience. The closed captions may include subtitles for almost every non-speech element (e.g., sound generated by different objects and/or persons other than spoken dialogue of a certain person). In certain live scenarios, a vocal deliverance of a participant or performer (such as, players, umpires, singers, background singers, and the like) of a live event may be inaudible or incomprehensible to a listener, who is a part of an audience of the live event. The vocal deliverance of the participant or performer of the live event may be inaudible as the listener in the audience may be seated far away from the arena of the live event. In such cases, the listener in the audience of the live event may be unable to determine and/or understand conversations between different participants of the live event. For example, in a live sports event, a listener in the audience may be unable to hear and understand a conversation between players and referees. In such cases, the overall listener experience for the live sports event may be negatively impacted for the listener who may wish to know about the conversation between the players and the referees.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An apparatus and a method for display control of different verbatim text of a vocal deliverance of a performer-of-interest in a live event, are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed apparatus and method for display control of different verbatim text of a vocal deliverance of a performer-of-interest in a live event. Exemplary aspects of the disclosure provide a display system that may include circuitry in a server and a display device. The circuitry may be configured to deduce caption information associated with a vocal deliverance of each of a plurality of performers-of-interest (such as a plurality of players or referees in a live sports event) in a live event. The circuitry may be further configured to control display of the deduced caption information on the display device such that a conversation between a first performer-of-interest (such as a first player) and a second performer-of-interest (such as a second player) of the plurality of performers-of-interest at the live event may be discernible on the display device.

Traditionally, it is difficult for a listener in the audience of a live event, such as a live sports event or a live concert, to know about vocal deliverances of each performer-of-interest of the plurality of performers-of-interest (e.g., a plurality of players, referees, commentators, etc., in a live sports event). The listener in the audience in the live event may be located at distance from an actual event area. This may be a reason that the listener in the audience may be unable to know what the plurality of performers-of-interest are enunciating in the live event. In some scenarios, the listener may be able to hear commentary by a commentator in the live event for actions of the plurality of performers-of-interest. However, in such cases, it may be difficult for the listener to understand the commentary due to differences in pronunciation, tone, delivery rate, proficiency in commentary language, or phonetics-related issues in the commentary enunciated by the commentators from same or different regions. As the listener may find it difficult to understand the vocal deliverances of the plurality of performers-of-interest in the live event, their enjoyment and belongingness for the live event may get negatively impacted. Thus, the disclosed apparatus is provided for a display control of different verbatim text of a vocal deliverance of a performer-of-interest (for example, a player in a live sports event) in a live event. The disclosed apparatus may further display caption information for the vocal deliverance of the plurality of performers-of-interest. The displayed caption information may help the listener in the audience at the live event to view different verbatim text for vocal deliverances of different performers-of-interest. The caption information may represent a conversation between each of the plurality of performers-of-interest.

Figure 1:
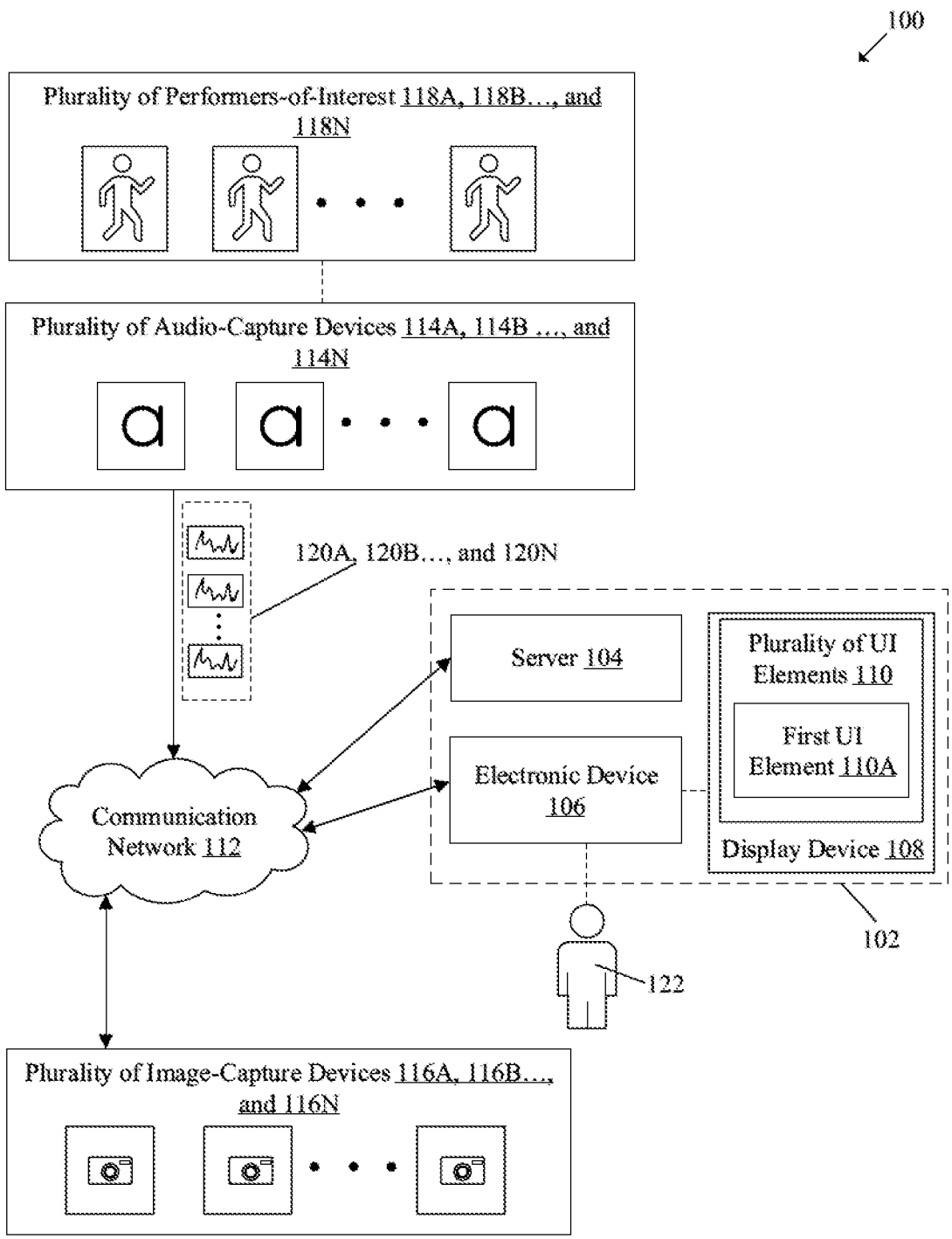
FIG. 1 is a block diagram that illustrates an exemplary network environment for display control of different verbatim text of a vocal deliverance of a performer-of-interest in a live event, in accordance with an embodiment of the disclosure.

FIG. 1 is a block diagram that illustrates an exemplary network environment for display control of different verbatim text of a vocal deliverance of a performer-of-interest in a live event, in accordance with an embodiment of the disclosure. With reference to FIG. 1, there is shown a network environment 100. The network environment 100 may include a display system 102, a server 104, an electronic device 106, and a display device 108. The display device 108 may include a plurality of User Interface (UI) elements 110 on a display screen of the display device 108. The network environment 100 may further include a communication network 112, a plurality of audio-capture devices 114A, 114B . . . , and 114N, and a plurality of image-capture devices 116A, 116B . . . , and 116N. The display system 102 may include the server 104, the electronic device 106, and the display device 108. The display system 102 may be communicatively coupled to the plurality of audio-capture devices 114A, 114B . . . , and 114N, via the communication network 112. There is further shown a plurality of performers-of-interest 118A, 118B . . . , and 118N. The plurality of audio-capture devices 114A, 114B . . . , and 114N may be attached with the plurality of performers-of-interest 118A, 118B . . . , and 118N. There is further shown a listener 122 who may be associated with the electronic device 106. The server 104 may be configured to receive a plurality of audio segments 120A, 120B . . . , and 120N from the plurality of audio-capture devices 114A, 114B . . . , and 114N, via the communication network 112.

The server 104 may comprise suitable logic, circuitry, and interfaces that may be configured to receive the plurality of audio segments 120A, 120B . . . , and 120N from the plurality of audio-capture devices 114A, 114B . . . , and 114N in a live event, via the communication network 112. The server 104 may be further configured to extract a first audio segment 120A of a first vocal deliverance of a first performer-of-interest 118A (e.g., a first player). The server 104 may be further configured to extract a second audio segment 120B of a second vocal deliverance of a second performer-of-interest 118B (e.g., a second player). The server 104 may be further configured to deduce new caption information from a verbatim text that is common between the first audio segment 120A and the second audio segment 120B. Examples of the server 104 may include, but are not limited to, a database server, a file server, a web server, a cloud server, an application server, a mainframe server, or other types of servers.

The electronic device 106 may comprise suitable logic, circuitry, and interfaces that may be configured to receive a user-input from the listener 122 in the live event. The listener 122 may be an audience member, a remote viewer, or a technical operator for the display of new caption information on the display device 108. Examples of the electronic device 106 may include, but are not limited to, a smart phone, a wearable smart-glass device, a head-mounted device, a computing device, a conferencing device, a mainframe machine, a server, a computer work-station, or a consumer electronic (CE) device. The display device 108 may comprise suitable logic, circuitry, and interfaces that may be configured to display new caption information associated with a vocal deliverance of the plurality of performers-of-interest 118A, 118B . . . , and 118N. The display device 108 may be further configured to display a video of the live event that may be captured by the plurality of image-capture devices 116A, 116B . . . , and 116N. The display device 108 may be an external display device associated with the electronic device 106. In some embodiments, the display device 108 may be a part of the electronic device 106. In some embodiments, the display device 108 may be a touch screen which may enable a listener, such as the listener 122, to provide a user-input via the display device 108. The touch screen may be at least one of a resistive touch screen, a capacitive touch screen, or a thermal touch screen. The display device 108 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 108 may refer to a display screen of a head mounted device (HMD), a smart-glass device, a see-through display, a projection-based display, an electro-chromic display, or a transparent display.

The communication network 112 may include a communication medium through which the server 104, the electronic device 106, and the plurality of audio-capture devices 114A, 114B . . . , and 114N may communicate with each other. Examples of the communication network 112 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 112, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The plurality of audio-capture devices 114A, 114B . . . , and 114N may comprise suitable logic, circuitry, and interfaces that may be configured to record a vocal deliverance of the plurality of performers-of-interest 118A, 118B . . . , and 118N at a live event. The plurality of audio-capture devices 114A, 114B . . . , and 114N may include a first audio-capture device 114A and a second audio-capture device 114B. The first audio-capture device 114A may be associated with a first performer-of-interest 118A. The first audio-capture device 114A may be configured to capture a first vocal deliverance associated with the first performer-of-interest 118A. Similarly, the second audio-capture device 114B may be associated with a second performer-of-interest 118B. The second audio-capture device 114B may be configured to capture a second vocal deliverance associated with the second performer-of-interest 118B. Examples of the plurality of audio-capture devices 114A, 114B . . . , and 114N may include, but are not limited to, a microphone, a recorder, and a Musical Instrument Digital Interface (MIDI) keyboard.

The plurality of image-capture devices 116A, 116B . . . , and 116N may comprise suitable logic, circuitry, and interfaces that may be configured to capture a video of the live event. Each image-capture device of the plurality of image-capture devices 116A, 116B . . . , and 116N may be configured to capture the video of the live event from a different field-of-view (FOV). The captured video of the live event may include the plurality of performers-of-interest 118A, 118B . . . , and 118N. Examples of the plurality of image-capture devices 116A, 116B . . . , and 116N may include, but are not limited to, a camera, a video camera, an image sensor, a color sensor (such as a red-green-blue (RGB) sensor), and the like.

The plurality of performers-of-interest 118A, 118B . . . , and 118N may include performers or participants who may have actively participated, managed, contributed to, or played a role in execution of the live event. As an example, in a live sports event, the plurality of performers-of-interest 118A, 118B . . . , and 118N may include a plurality of sports players, referees, commentators, coaches, support staff, and the like. As another example, in a live concert event, the plurality of performers-of-interest 118A, 118B . . . , and 118N may include a plurality of singers, a plurality of instrument players, a presenter of the live concert, and the like.

The listener 122 may be a technical operator that controls (or supervises) display of caption information, a mediated audience member, or an immediate audience member who may be a part of a live audience in a live event, such as a live sports scenario, a live concert, or a live conference. In some cases, the listener 122 may utilize an input device, such as a touch device or a microphone, to provide a user-input to the electronic device 106.

In operation, the server 104 may be configured to receive a plurality of audio segments 120A, 120B . . . , and 120N from the plurality of audio-capture devices 114A, 114B . . . , and 114N, via the communication network 112. The plurality of audio segments 120A, 120B . . . , and 120N may correspond to a live event, such as a live sports event and a live concert. The plurality of audio-capture devices 114A, 114B . . . , and 114N may be attached to the plurality of performers-of-interest 118A, 118B . . . , and 118N. As an example, each audio-capture device of the plurality of audio-capture devices 114A, 114B . . . , and 114N may be attached near a mouth of each performer-of-interest of the plurality of performers-of-interest 118A, 118B . . . , and 118N. As another example, the plurality of audio-capture devices 114A, 114B . . . , and 114N may be a plurality of microphones that may be attached to a stand and placed near a mouth of each performer-of-interest of the plurality of performers-of-interest 118A, 118B . . . , and 118N. As another example, each audio-capture device of the plurality of audio-capture devices 114A, 114B . . . , and 114N may be attached to a cloth that each performer-of-interest of the plurality of performers-of-interest 118A, 118B . . . , and 118N may be wearing in the live event.

The plurality of audio-capture devices 114A, 114B . . . , and 114N may be configured to record a vocal deliverance of the plurality of performers-of-interest 118A, 118B . . . , and 118N at the live event. For example, the plurality of performers-of-interest 118A, 118B . . . , and 118N at a live sports event may include, but are not limited to, a plurality of players, referees, commentators, and coaches. The plurality of audio-capture devices 114A, 114B . . . , and 114N may record whatever the plurality of performers-of-interest 118A, 118B . . . , and 118N may enunciate at the live event.

In accordance with an embodiment, the plurality of image-capture devices 116A, 116B . . . , and 116N may be configured to capture the video of the live event. Each image-capture device of the plurality of image-capture devices 116A, 116B . . . , and 116N may be configured to capture the video of the live event from the different FOV. The video captured by each of the plurality of image-capture devices 116A, 116B . . . , and 116N may include the plurality of performers-of-interest 118A, 118B . . . , and 118N. The plurality of image-capture devices 116A, 116B . . . , and 116N may be further configured to capture a plurality of gestures of each of the plurality of performers-of-interest 118A, 118B . . . , and 118N. For example, a first image-capture device 116A may be configured to capture a gesture (such as a hand gesture to call a person) of the first performer-of-interest 118A.

The server 104 may be further configured to identify a user-type of each performer-of-interest of the plurality of performers-of-interest 118A, 118B . . . , and 118N. An audio-capture device of the plurality of audio-capture devices 114A, 114B . . . , and 114N may be attached to each performer-of-interest of the plurality of performers-of-interest 118A, 118B . . . , and 118N. The server 104 may be further configured to identify the user-type of each performer-of-interest of the plurality of performers-of-interest 118A, 118B . . . , and 118N based on an identity (such as a name) of the each performer-of-interest of the plurality of performers-of-interest 118A, 118B . . . , and 118N.

For example, in a live sports event, the server 104 may identify whether a performer-of-interest of the plurality of performers-of-interest 118A, 118B . . . , and 118N is at least one of a player, a referee, a commentator, or an important guest at the live sports event. The server 104 may be further configured to identify which audio-capture device of the plurality of audio-capture devices 114A, 114B . . . , and 114N may be attached with which user-type associated with each of the plurality of performers-of-interest 118A, 118B . . . , and 118N. The server 104 may be further configured to tag each audio-capture device of the plurality of audio-capture devices 114A, 114B . . . , and 114N based on the identified user-type and the identity of each performer-of-interest of the plurality of performers-of-interest 118A, 118B . . . , and 118N associated with the plurality of audio-capture devices 114A, 114B . . . , and 114N.

For example, in a live sports event, the first performer-of-interest 118A may be a player of a first team, the server 104 may be configured to identify the user-type of the first performer-of-interest 118A (i.e. a player of the first team) and further tag the first audio-capture device 114A based on the user-type and identity (e.g. a name) of the first performer-of-interest 118A (i.e. a player of the first team).

The server 104 may be further configured to receive a user-input from a user, such as the listener 122. The user-input may correspond to a selection of a first UI element 110A from the plurality of UI elements 110. The plurality of UI elements 110 may be a part of a UI that may be rendered on a display screen (e.g., the display device 108) of the electronic device 106. The plurality of UI elements 110 may represent the plurality of performers-of-interest 118A, 118B . . . , and 118N at the live event or the plurality of audio-capture devices 114A, 114B . . . , and 114N attached to the plurality of performers-of-interest 118A, 118B . . . , and 118N at the live event. For example, the plurality of UI elements 110 may be a plurality of buttons on the UI of the electronic device 106 that may represent a name of each of a plurality of players and each of a plurality of referees present in a live sports event, such as a live football match. The first UI element 110A may represent the first performer-of-interest 118A (e.g., a first player) of the plurality of performers-of-interest 118A, 118B . . . , and 118N (e.g., a plurality of players at a live sports event) at the live event or a first audio-capture device 114A attached to the first performer-of-interest 118A. Alternatively stated, the listener 122 may select the first UI element 110A to select the first performer-of-interest 118A or the first audio-capture device 114A, via the electronic device 106.

In some embodiments, a video stream of the live event may be rendered on a display screen (i.e. the display device 108) of the electronic device 106. In such cases, the first UI element 110A may correspond to an image of the first performer-of-interest 118A in the video stream. The listener 122 may select the image of the first performer-of-interest 118A rendered on the display screen of the electronic device 106.

The server 104 may be further configured to detect the second performer-of-interest 118B of the plurality of performers-of-interest 118A, 118B . . . , and 118N. The second performer-of-interest 118B may be associated with the second audio-capture device 114B. The second performer-of-interest 118B associated with the second audio-capture device 114B may be detected within a threshold range of the first audio-capture device 114A. The second performer-of-interest 118B may be detected, based on a geo-location of the first audio-capture device 114A and the second audio-capture device 114B and the received user-input. The geo-location of the first audio-capture device 114A may be a geographical location of the first audio-capture device 114A and the geo-location of the second audio-capture device 114B may be a geographical location of the second audio-capture device 114B. The second audio-capture device 114B may be in the threshold range of the first audio-capture device 114A. For example, in the scenario of the live sports event, the server 104 may be configured to select a second player from the plurality of players that may be associated with the second audio-capture device 116. The detected second player from the plurality of players may be in vicinity of the first player and within the threshold range of the first audio-capture device 114A, and the first player and the second player may be talking to each other.

Each performer-of-interest of the plurality of performers-of-interest 118A, 118B . . . , and 118N may be associated with a location sensor (not shown) that may be configured to detect a geo-location of each performer-of-interest of the plurality of performers-of-interest 118A, 118B . . . , and 118N. The geo-location of each of the plurality of audio-capture devices 114A, 114B . . . , and 114N may correspond to the detected geo-location of a corresponding performer-of-interest associated with a corresponding audio-capture device. For example, a location sensor may be attached to the first performer-of-interest 118A. The location sensor may be configured to detect the geo-location of the first performer-of-interest 118A. The geo-location of the first audio-capture device 114A may be same as the detected geo-location of the first performer-of-interest 118A.

In some scenarios, each performer-of-interest of the plurality of performers-of-interest 118A, 118B . . . , and 118N may wear a wearable device that may include the location sensor. The location sensor may be a Global Navigation Satellite System (GNSS) receiver that relies on tracking data from a constellation of satellites to estimate the geo-location (such as latitude and longitude values). Alternatively, the location sensor may include an accelerometer or a velocity sensor along with a gyroscopic sensor to estimate a location based on an update of a reference location of each performer-of-interest of the plurality of performers-of-interest 118A, 118B . . . , and 118N.

The server 104 may be further configured to extract the first audio segment 120A of a first vocal deliverance of the first performer-of-interest 118A (for example, a first player in a live game) from the received plurality of audio segments 120A, 120B . . . , and 120N. Similarly, the server 104 may be further configured to extract the second audio segment 120B of a second vocal deliverance of the second performer-of-interest 118B (for example, a second player in the live game) from the received plurality of audio segments 120A, 120B . . . , and 120N. The first audio segment 120A and the second audio segment 120B may be extracted based on the received user-input for the selection of the first UI element 110A. The first UI element 110A may represent the first performer-of-interest 118A or the first audio-capture device 114A.

In accordance with an embodiment, the server 104 may be configured to extract the first audio segment 120A of the first vocal deliverance of a first player and the second audio segment 120B of the second vocal deliverance of a second player at a live sports event. In the live sports event, the first player may be in a conversation with the second player and the second player may be in the vicinity of the first player. In such a scenario, the first audio segment 120A and the second audio segment 120B may be extracted based on the received user-input from a listener in the audience of the live sports event. The user-input may be received for the selection of the first UI element 110A that represents the first player.

In accordance with an embodiment, the server 104 may also act as a broadcast server which may be configured to broadcast a video of the live event selectively to a plurality of electronic devices (such as smartphones, televisions, etc.) associated with a plurality of users. In such cases, the listener 122 may not be present in the audience of the live event. Instead, the listener may be a remote audience member that may access the broadcasted video of the live event using the electronic device 106. For example, the listener 122 may view a streamed video of the live event on a television at a location that is different from a location of the live event.

The server 104 may be further configured to determine a first verbatim text that is common between the first audio segment 120A and the second audio segment 120B. The first verbatim text may be a text for a common portion between the first audio segment 120A and the second audio segment 120B. The common portion between the first audio segment 120A and the second audio segment 120B may be a conversation between the first performer-of-interest 118A and the second performer-of-interest 118B. The conversation may be captured by both the first audio-capture device 114A and the second audio-capture device 114B. For example, the first player may be talking to the second player in the live sports event. The first verbatim text may represent the exact conversation between the first player and the second player.

In accordance with an embodiment, the server 104 may be further configured to determine an interaction-type between the first performer-of-interest 118A and the detected second performer-of-interest 118B from the first verbatim text. The server 104 may be configured to determine the interaction-type based on the identified user-type of the first performer-of-interest 118A and the second performer-of-interest 118B.

The interaction-type between the first performer-of-interest 118A and the second performer-of-interest 118B may represent an interaction between two same or different user-types (for e.g., a player type, a referee type, etc.) associated with the first performer-of-interest 118A and the second performer-of-interest 118B.

In one example, in a case where the user-type of both the first performer-of-interest 118A and the second performer-of-interest 118B is a player type, then the interaction-type between the first performer-of-interest 118A and the second performer-of-interest 118B may be a player-to-player interaction. In another example, in a case where the user-type of the first performer-of-interest 118A is a referee type and the user-type of the second performer-of-interest 118B is the player type, then the interaction-type between the first performer-of-interest 118A and the second performer-of-interest 118B is a referee-to-player interaction.

The server 104 may be further configured to determine meaning of the first verbatim text based on a plurality of audio parameters. The plurality of audio parameters may include, but are not limited to, a meaning of each word of the plurality of words in the first verbatim text, a context parameter, a pitch parameter, a loudness parameter, an intonation parameter, or a tone parameter. The plurality of audio parameters may further include, but are not limited to, a rate-of-speech parameter, an intensity of overtones, a voice modulation parameter, a phonetic parameter, a pronunciation parameter, a prosody parameter, or one or more psychoacoustic parameters.

An embodiment for the determination of the meaning of the first verbatim text is presented herein. The server 104 may be configured to identify a plurality of words present in the first verbatim text. The server 104 may be further configured to determine meaning of each word of the plurality of words. The determined meaning of each word of the first verbatim text may be a meaning of that word from a database of word meanings. The server 104 may be further configured to identify a level of stress associated with enunciation of each word from a performer-of-interest (such as the first performer-of-interest 118A) in the live event. The level of stress may be identified based on the plurality of audio parameters.

The server 104 may be further configured to determine a context of the first verbatim text based on the identified meaning of each of the plurality of words of the first verbatim text and the identified level of stress associated with enunciation of each word of the plurality of words in the first verbatim text. The meaning and/or the context of the first verbatim text may be different for a different value of the identified level of stress based on the plurality of audio parameters. As an example, a phrase, such as "Come Here", may have a different context (or sentiment) for a different value of the level of stress. If a first player will say "Come Here" to a second player loudly (such that the value of the level of stress is greater than a threshold), then the context for the "Come Here" may be that the first player is unhappy or even angry with the second player. As another example, if the first player says "Come Here" to a second player softly such that the value of the level of stress is less than a threshold, then the context for "Come Here" may be a call for a casual conversation between the first player and the second player.

The server 104 may be further configured to deduce new caption information from the first verbatim text, based on the determined meaning of the first verbatim text and a specified set of evaluation parameters. The specified set of evaluation parameters may be stored on the server 104. The specified set of evaluation parameters may include, but are not limited to, a type of the live event, a current time of the live event, or a profile of each performer-of-interest of the plurality of performers-of-interest 118A, 118B . . . , and 118N. The specified set of evaluation parameters may further include, but are not limited to, a user-type of each performer-of-interest of the plurality of performers-of-interest 118A, 118B . . . , and 118N, priority information associated with each performer-of-interest of the plurality of performers-of-interest 118A, 118B . . . , and 118N, or a geo-location of the live-event. The server 104 may be configured to evaluate the first verbatim text by using the specified set of evaluation parameters. The evaluation of the first verbatim text may correspond to a detection of unsuitable words (e.g. offensive or derogatory words or remarks) from the first verbatim text based on the specified set of evaluation parameters. Alternatively stated, the server 104 may be configured to identify whether the first verbatim text is suitable to be shown to the listener 122 in the audience of the live event. Also, the deduction of the new caption information may correspond to a removal or replacement of the unsuitable words from the first verbatim text.

In accordance with an embodiment, the server 104 may be configured to deduce the new caption information further based on the determined interaction-type between the first performer-of-interest 118A and the second performer-of-interest 118B. The deduced new caption information may be different from the first verbatim text. Alternatively stated, the deduced new caption information may be different from an exact phrase that may be enunciated by the first performer-of-interest 118A and the second performer-of-interest 118B. The difference in the new caption information from the exact phrase may be identified based on the specified set of evaluation parameters. The deduction of the new caption information from the first verbatim text has been described, for example, in FIG. 3.

The server 104 may be further configured to control display of the deduced new caption information on the display device 108 such that a conversation between the first performer-of-interest 118A and the second performer-of-interest 118B at the live event is discernible on the display device 108. The new caption information displayed on the display device 108 may represent a conversation between the first performer-of-interest 118A and the second performer-of-interest 118B. For example, in the live sports event, a first player of a plurality of players may be engaged in a discussion for a game move with a second player. In a case where the listener 122 in the audience wants to view the conversation between the two players, the listener 122 may be able to view the new caption information that represents the conversation between the first player and the second player on the display device 108. The new caption information may be displayed on the display device 108 when the first performer-of-interest 118A and the second performer-of-interest 118B enunciate the first audio segment 120A and the second audio segment 120B, in real-time or near real-time. Thus, the listener 122 in the audience of the live sports event may be able to view and understand different conversations between the plurality of performers-of-interest 118A, 118B . . . , and 118N (such as players, referees, and commentators).

Figure 2:
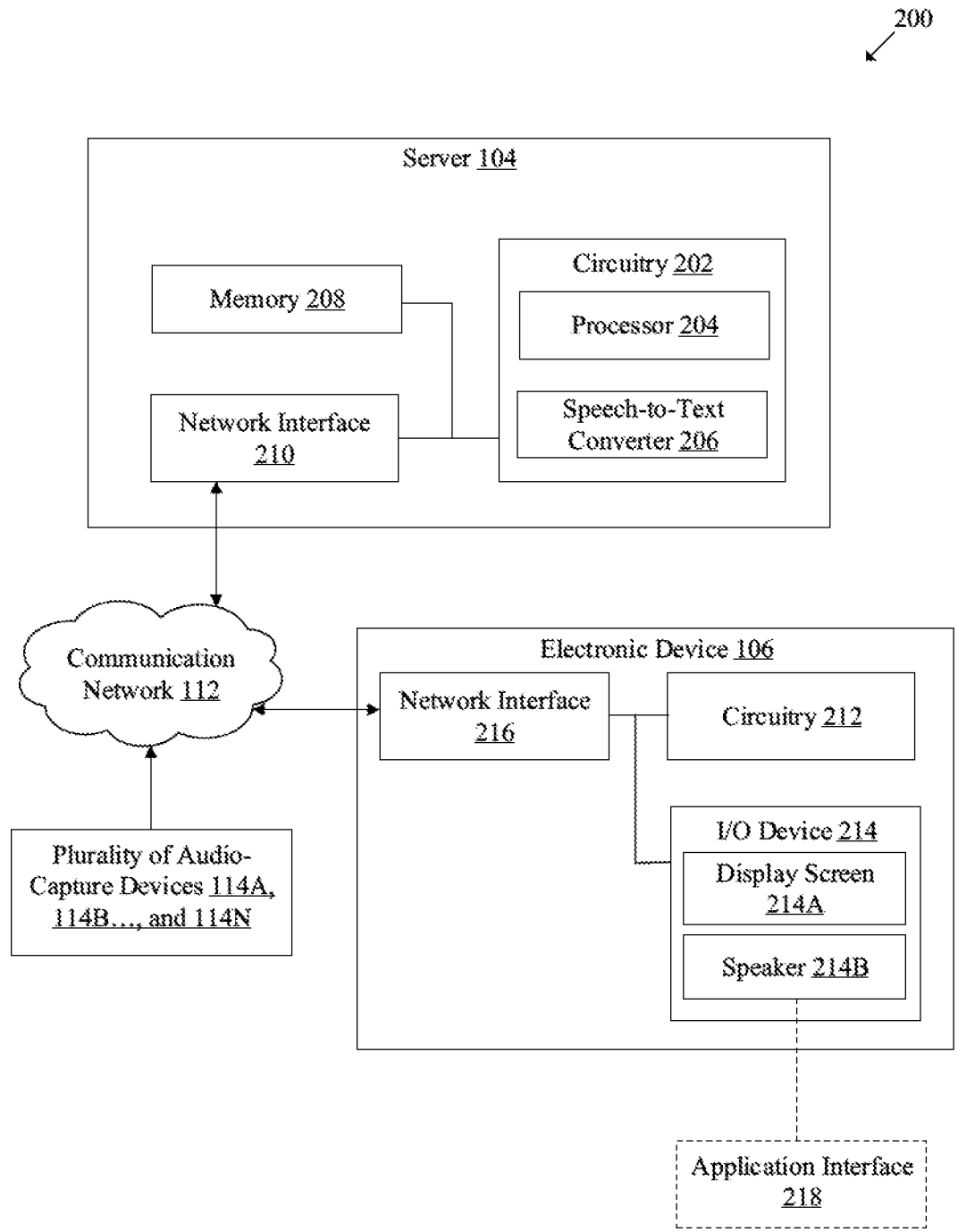
FIG. 2 is a block diagram that illustrates an exemplary server and an exemplary electronic device of an exemplary display system for display control of different verbatim text of a vocal deliverance of a performer-of-interest in a live event, in accordance with an embodiment of the disclosure.

FIG. 2 is a block diagram that illustrates an exemplary server and an exemplary electronic device of an exemplary display system for display control of different verbatim text of a vocal deliverance of a performer-of-interest in a live event, in accordance with an embodiment of the disclosure. FIG. 2 is explained in conjunction with elements from FIG.

1. With reference to FIG. 2, there is shown a block diagram 200 of the server 104 and the electronic device 106. The server 104 and the electronic device 106 may be communicatively coupled to the plurality of audio-capture devices 114A, 114B . . . , and 114N, via the communication network 112. The server 104 may include circuitry 202, a processor 204, a speech-to-text converter 206, a memory 208, and a network interface 210. The electronic device 106 may include circuitry 212, an input/output (I/O) device 214, and a network interface 216. The I/O device 214 may include a display screen 214A and a speaker 214B. The display screen 214A may be utilized to render an application interface 218. The circuitry 202 may include the processor 204 and the speech-to-text converter 206. The circuitry 202 may be communicatively coupled to the memory 208. The circuitry 202 may be configured to communicate with the electronic device 106 and the plurality of audio-capture devices 114A, 114B . . . , and 114N, by use of the network interface 210.

The circuitry 202 may comprise suitable logic, circuitry, and interfaces that may be configured to receive the plurality of audio segments 120A, 120B . . . , and 120N from the plurality of audio-capture devices 114A, 114B . . . , and 114N. The circuitry 202 may be further configured to detect the second performer-of-interest 118B associated with the second audio-capture device 114B that may be within the threshold range of the first audio-capture device 114A. The circuitry 202 may be further configured to deduce the new caption information from the first verbatim text. The circuitry 202 may be implemented based on a number of processor technologies known in the art. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), and other processors.

The speech-to-text converter 206 may comprise suitable logic, circuitry, and interfaces that may be configured to convert the extracted first audio segment 120A and the second audio segment 120B to a text. The speech-to-text converter 206 may be further configured to generate the first verbatim text that is common between the first audio segment 120A and the second audio segment 120B. The speech-to-text converter 206 may be implemented based on a number of processor technologies known in the art. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), and other processors.

The memory 208 may comprise suitable logic, circuitry, and interfaces that may be configured to store the received plurality of audio segments 120A, 120B . . . , and 120N. The memory 208 may be further configured to store a plurality of audio parameters and a specified set of evaluation parameters. Examples of implementation of the memory 208 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 210 may comprise suitable logic, circuitry, and interfaces that may be configured to facilitate communication between the server 104, the electronic device 106, the plurality of audio-capturing devices 114A, 114B . . . , and 114N, and the plurality of image-capture devices 116A, 116B . . . , and 116N, via the communication network 112. The network interface 210 may be implemented by use of various known technologies to support wired or wireless communication of the server 104 with the communication network 112. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 210 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The circuitry 212 may comprise suitable logic, circuitry, and interfaces that may be configured to receive a user-input from a user, such as the listener 122. The listener may be an immediate audience member at the live event, or mediated audience from a remote location, or a technical operator at the live event. The circuitry 212 may be further configured to communicate the received user-input to the server 104 via the network interface 216. The circuitry 212 may be further configured to receive new caption information from the server 104 and control the display of the new caption information on the display screen 214A (as an output to the listener 122). The circuitry 212 may be implemented based on a number of processor technologies known in the art. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), and other processors.

The I/O device 214 may comprise suitable logic, circuitry, and interfaces that may be configured to receive an input from a user (such as the listener 122) and provide an output to the user based on the received input from the user. For example, the I/O device 214 may be utilized to receive the user-input for a selection of the first UI element 110A that may represent the first performer-of-interest 118A associated with the first audio-capture device 114A. The I/O device 214 which may include various input and output devices, may be configured to communicate with the circuitry 212 of the electronic device 106 and the server 104. Examples of the I/O device 214 may include, but are not limited to, a touch screen, a keyboard, a mouse, a joystick, a microphone, a display screen (for example, the display screen 214A), and a speaker (for example, the speaker 214B). In accordance with an embodiment, the display screen 214A may be same as the display device 108.

The network interface 216 may comprise suitable logic, circuitry, and interfaces that may be configured to facilitate communication between the electronic device 106, the server 104, the plurality of audio-capturing devices 114A, 114B . . . , and 114N, and the plurality of image-capture devices 116A, 116B . . . , and 116N, via the communication network 112. The network interface 216 may be implemented by use of various known technologies to support wired or wireless communication of the electronic device 106 with the communication network 112. The network interface 216 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 216 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The application interface 218 may correspond to a user interface (UI) rendered on a display screen, such as the display screen 214A. The application interface 218 may be configured to display the new caption information associated with the vocal deliverance of the first performer-of-interest 118A and the second performer-of-interest 118B. An example of the application interface 218 may include, but is not limited to, a graphical user interface (GUI). In some embodiments, the application interface 218 rendered on the display device 108 may be an internal display screen integrated with the electronic device 106. The operation of the circuitry 202 is described in detail, for example in FIGS. 3, 4A, 4B, and 5.

Figure 3:
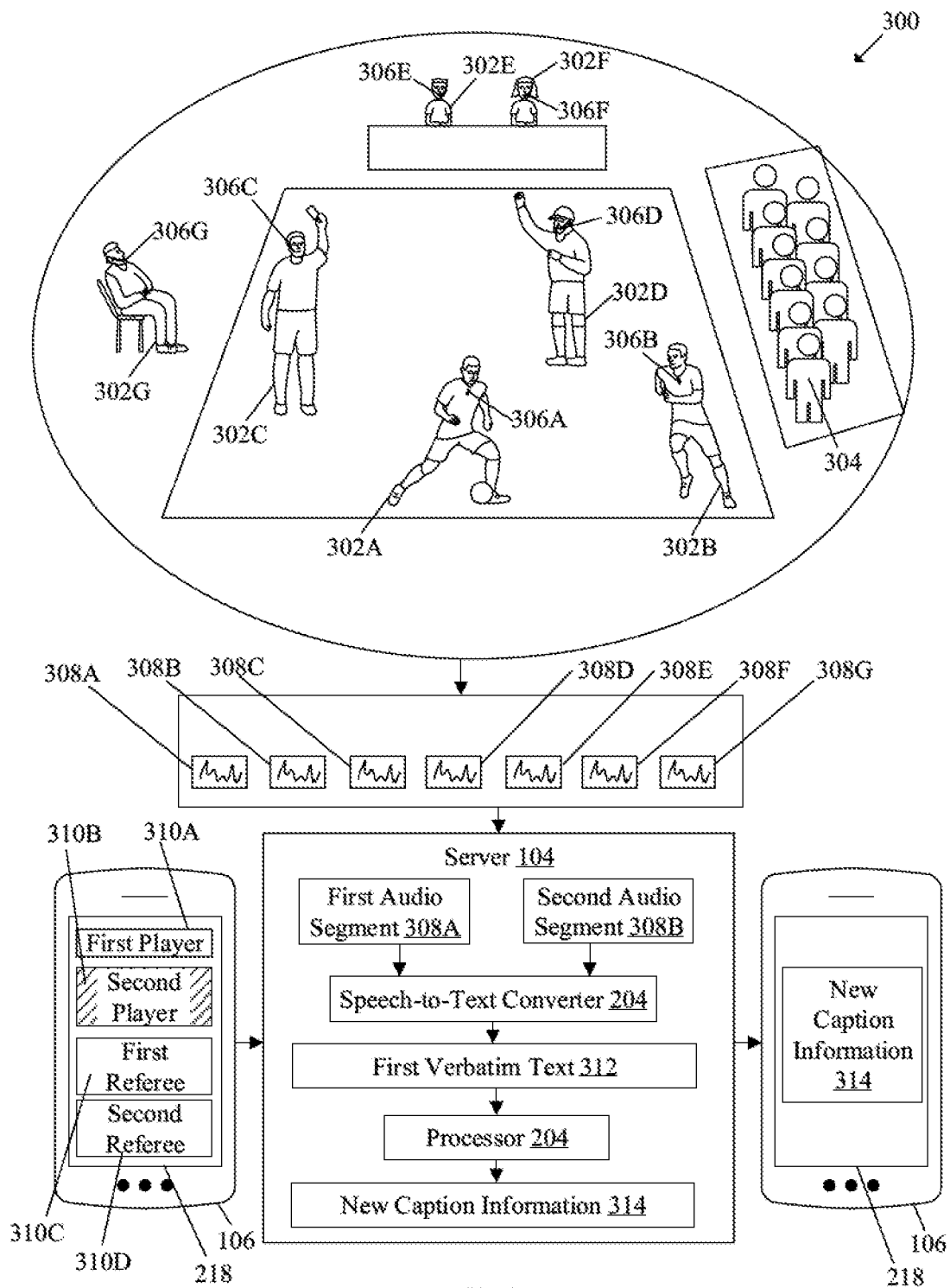
FIG. 3 illustrates an exemplary scenario for display control of different verbatim text of a vocal deliverance of a performer-of-interest in a live sports event, in accordance with an embodiment of the disclosure.

FIG. 3 illustrates an exemplary scenario for display control of different verbatim text of a vocal deliverance of a performer-of-interest in a live sports event, in accordance with an embodiment of the disclosure. FIG. 3 is explained in conjunction with elements from FIG. 1 and FIG. 2. With reference to FIG. 3, there is shown a live sports event environment 300 that includes a plurality of performers-of-interest 302A, 302B, 302C, 302D, 302E, 302F, and 302G, a listener 304, and a plurality of audio-capture devices 306A, 306B, 306C, 306D, 306E, 306F, and 306G. A plurality of audio segments 308A, 308B, 308C, 308D, 308E, 308F, and 308G may be captured by the plurality of audio-capture devices 306A, 306B, 306C, 306D, 306E, 306F, and 306G. There is further shown a plurality of User Interface (UI) elements to 310A, 310B, 310C, and 310D, a first verbatim text 312, and new caption information 314.

The plurality of performers-of-interest 302A, 302B, 302C, 302D, 302E, 302F, and 302G may include players, referees, commentators, special guests, and the like. The plurality of performers-of-interest 302A, 302B, 302C, 302D, 302E, 302F, and 302G may correspond to the plurality of performers-of-interest 118A to 118N. The plurality of performers-of-interest 302A, 302B, 302C, 302D, 302E, 302F, and 302G may be present in the live sports event environment 300. For example, the first performer-of-interest 302A may be a first player, the second performer-of-interest 302B may be a second player, a third performer-of-interest 302C may be a first referee, and a fourth performer-of-interest 302D may be a second referee. Further, a fifth performer-of-interest 302E may be a first commentator, a sixth performer-of-interest 302F may be a second commentator, and a seventh performer-of-interest 302G may be a special guest, for example, a former player or a celebrity.

The plurality of audio-capture devices 306A, 306B, 306C, 306D, 306E, 306F, and 306G may be attached to each of the plurality of performers-of-interest 302A, 302B, 302C, 302D, 302E, 302F, and 302G. The plurality of audio-capture devices 306A, 306B, 306C, 306D, 306E, 306F, and 306G may be configured to record the vocal deliverance of the plurality of performers-of-interest 302A, 302B, 302C, 302D, 302E, 302F, and 302G present in the live sports event environment 300. The processor 204 may be configured to receive the plurality of audio segments 308A, 308B, 308C, 308D, 308E, 308F, and 308G of the vocal deliverances of the plurality of performers-of-interest 302A, 302B, 302C, 302D, 302E, 302F, and 302G.

At same or at different time steps in the live sports event, the plurality of performers-of-interest 302A, 302B, 302C, 302D, 302E, 302F, and 302G may be engaged in a conversation with each other in the live sports event environment 300. Some of the audience members associated with the live sports event environment 300 may want to know about the conversation associated with each of the plurality of performers-of-interest 302A, 302B, 302C, 302D, 302E, 302F, and 302G. For example, referees may be engaged in communication with each other about a decision to be made in between the game and the audience may want to know about the decision and the communication between the referees.

The listener 304 may be a part of the audience in the live sports event environment 300 and may hold the electronic device 106 (such as a smartphone) in the game. The electronic device 106 may be configured to render the plurality of UI elements 310A, 310B, 310C, and 310D on the application interface 218. Each UI element of the plurality of UI elements 310A, 310B, 310C, and 310D may be utilized by the listener 304 for a selection of a performer-of-interest from the plurality of performers-of-interest 302A, 302B, 302C, 302D, 302E, 302F, and 302G. For example, a first UI element 310A (labelled as "First Player") may be utilized for a selection of a first player from a plurality of players in the live sports event. Similarly, a second UI element 310B (labelled as "Second Player") may be utilized for a selection of a second player from the plurality of players in the live sports event. Similarly, a third UI element 310C (labelled as "First Referee") may be utilized for a selection of a first referee from a plurality of referees in the live sports event and a fourth UI element 310D (labelled as "Second Referee") may be utilized for a selection of a second referee from the plurality of referees in the live sports event.

The processor 204 may be configured to receive an user-input that corresponds to a selection of a performer-of-interest from the plurality of performers-of-interest 302A, 302B, 302C, 302D, 302E, 302F, and 302G. For example, the listener 304 may select the second UI element 310B (labelled as the "Second Player") that corresponds to the selection of the second performer-of-interest 302B. The second UI element 310B (labelled as the "Second Player" and also shown as shaded) may be selected by the listener 304 in the audience. The processor 204 may be further configured to detect another performer-of-interest from the plurality of performers-of-interest 302A, 302B, 302C, 302D, 302E, 302F, and 302G, which may be different from the selected second performer-of-interest 302B. For example, the processor 204 may be configured to detect the first performer-of-interest 302A (labelled as the first player) who may be in the vicinity of the selected second performer-of-interest 302B. The first performer-of-interest 302A may be detected based on the geo-location of the first audio-capture device 306A.

In accordance with an embodiment, the processor 204 may be configured to retrieve the geo-location of each audio-capture device of the plurality of audio-capture devices 306A, 306B, 306C, 306D, 306E, 306F, and 306G. The first audio-capture device 306A attached to the first performer-of-interest 302A may be within a threshold range of the second audio-capture device 306B. The second audio-capture device 306B may be attached to the selected second performer-of-interest 302B (labelled as the second player). The listener 304 may utilize the selected second UI element 310B to view a conversation between the selected second performer-of-interest 302B (labelled as the second player) and the detected first performer-of-interest 302A (labelled as the first player).

The processor 204 may be further configured to extract the second audio segment 308B of the vocal deliverance of the second performer-of-interest 302B from the plurality of audio segments 308A, 308B, 308C, 308D, 308E, 308F, and 308G. Similarly, the processor 204 may be further configured to extract the first audio segment 308A of the vocal deliverance of the detected first performer-of-interest 302A from the plurality of audio segments 308A, 308B, 308C, 308D, 308E, 308F, and 308G.

The speech-to-text converter 206 may be configured to generate a text for each of the first audio segment 308A and the second audio segment 308B. The processor 204 may be further configured to extract the first verbatim text 312 that may be common between the first audio segment 308A and the second audio segment 308B. The first verbatim text 312 may represent a vocal deliverance of a conversation between the second performer-of-interest 302B (labelled as the second player) and the first performer-of-interest 302A (labelled as the first player) that may be captured in both the first audio-capture device 306A and the second audio-capture device 306B. The first verbatim text 312 may represent a conversation between the second performer-of-interest 302B (e.g., the second player) and the first performer-of-interest 302A (e.g., the first player) only.

In some embodiments, the processor 204 may be configured to extract an entire verbatim text of the first audio segment 308A and the second audio segment 308B instead of only a portion that is common between the first audio segment 308A and the second audio segment 308B. Thus, the entire verbatim text may include some phrases that the selected second performer-of-interest 302B may enunciate on his own or as a part of a conversation with another performer-of-interest different from the first performer-of-interest 302A. For example, the second player may engage in a different conversation with another player (such as a third player) who may be beyond the threshold range of the second audio-capture device 306B. In such cases, the second audio segment 308B may include a portion of the different conversation between the second player and the third player. Further, the entire verbatim text may also include a text for the portion of the different conversation between the second player and the third player.

The processor 204 may be further configured to determine a meaning of the first verbatim text 312 based on the plurality of audio parameters. The processor 204 may be configured to determine if the first verbatim text 312 is appropriate to be displayed to the audience or not. The processor 204 may be further configured to identify any phrase or word that may be offensive or may be inappropriate for display to the audience. The processor 204 may be further configured to determine a context of the first verbatim text 312. For example, the processor 204 may be configured to determine whether the first verbatim text 312 is enunciated in a specific mood or sentiment, such as angry mood, casual way, a comical manner, or a sarcastic manner, based on the plurality of audio parameters.

The processor 204 may be further configured to evaluate the first verbatim text 312 based on the specified set of evaluation parameters. The processor 204 may be configured to determine a type of information in the first verbatim text 312 and identify if the information is appropriate to be displayed to the listener 304 in the audience. In one example, there may be some confidential or strategic information that may be exchanged as part of a conversation between players of a team in the live sports event. In such cases, the processor 204 may be configured to evaluate the first verbatim text 312 to be inappropriate for display to the listener 304 in the audience. In another example, the first verbatim text 312 may include some offensive words that may be inappropriate for display to the listener 304 in the audience.

In accordance with an embodiment, the processor 204 may be further configured to determine a priority of the first verbatim text 312, based on the specified set of evaluation parameters. For example, the first verbatim text 312 may represent a conversation between a captain of a team in the live sports event and the referee for the live sports event. In such cases, it may be more likely that the listener 304 may want to view the conversation and a priority value of the first verbatim text 312 may be high. On the contrary, for a scenario where the first verbatim text 312 may represent a conversation between two non-active players (i.e. not in active play at a given time in the field) in the live sports event, it may be more likely that the listener 304 may not want to view the conversation and a priority value of the first verbatim text 312 may be low.

The processor 204 may be further configured to deduce new caption information 314 from the first verbatim text 312 that is common between the first audio segment 308A and the second audio segment 308B. The new caption information 314 may be deduced from the first verbatim text 312 based on the determined meaning of the first verbatim text 312 and the evaluation of the first verbatim text 312 based on the specified set of evaluation parameters. In some scenarios, the first verbatim text 312 may be inappropriate to be disclosed to the audience. In such cases, the processor 204 may be configured to modify the first verbatim text 312 and deduce the new caption information 314 that may be appropriate to be disclosed to the listener 304 in the audience.

In one example, if the second player has used an offensive word in a conversation with the first player in the live sports event, then the processor 204 may be configured to modify the offensive word in the first verbatim text 312 and deduce the new caption information 314 that may have the same context but the offensive word may be either absent from the new caption information 314 or replaced with a set of encoded symbols (e.g., asterisk). In another example, if the conversation between the second player and the first player is confidential for the team, then the processor 204 may be configured to modify the first verbatim text 312 and deduce the new caption information 314 such that the confidential information is either removed from the new caption information 314 or replaced with a set of encoded symbols (e.g., asterisk). In another example, a conversation between the second player and the first player may correspond to a reaction on a shot that the first player may have played. The reaction may be appropriate to be displayed in the new caption information 314 to the listener 304 in the audience. In such cases, the processor 204 may be configured to deduce the new caption information 314 that may include the first verbatim text 312. More specifically, the new caption information 314 may include the first verbatim text 312 without any modifications in the first verbatim text 312.

The processor 204 may be further configured to control the display of the deduced new caption information 314 on the application interface 218 of the electronic device 106. In some embodiments, the processor 204 may be further configured to display the deduced new caption information 314 on the display device 108 (such as an external display screen) that may be associated with the electronic device 106. The new caption information 314 may be displayed on the application interface 218 of the electronic device 106 such that the conversation between the second performer-of-interest 302B (labelled as the second player) and the first performer-of-interest 302A (labelled as the first player) is discernible on the application interface 218 of the display device 108. Thus, the listener 304 present in the audience in the live sports event environment 300 may be able to view the new caption information 314 that represents the vocal deliverance of the second performer-of-interest 302B (labelled as the second player) and the first performer-of-interest 302A (labelled as the first player). The new caption information 314 may be displayed in real-time or near real-time as and when the second performer-of-interest 302B and the first performer-of-interest 302A enunciates the second audio segment 308B and the first audio segment 308A, respectively, in the live sports event environment 300.

In accordance with an embodiment, the processor 204 may be further configured to control playback of the extracted first audio segment 308A and the second audio segment 308B via a speaker, such as the speaker 214B. The playback of the extracted first audio segment 308A and the second audio segment 308B may be controlled in synchronization with the display of the new caption information 314 on the application interface 218. For example, the listener 304 may be able to hear the first audio segment 308A and the second audio segment 308B via the speaker 214B along with the display of the new caption information 314. This may be in real time or near real time as and when either of the first performer-of-interest 302A enunciates the first audio segment 308A or the second performer-of-interest 302B enunciates the second audio segment 308B in the live event.

Figure 4A:
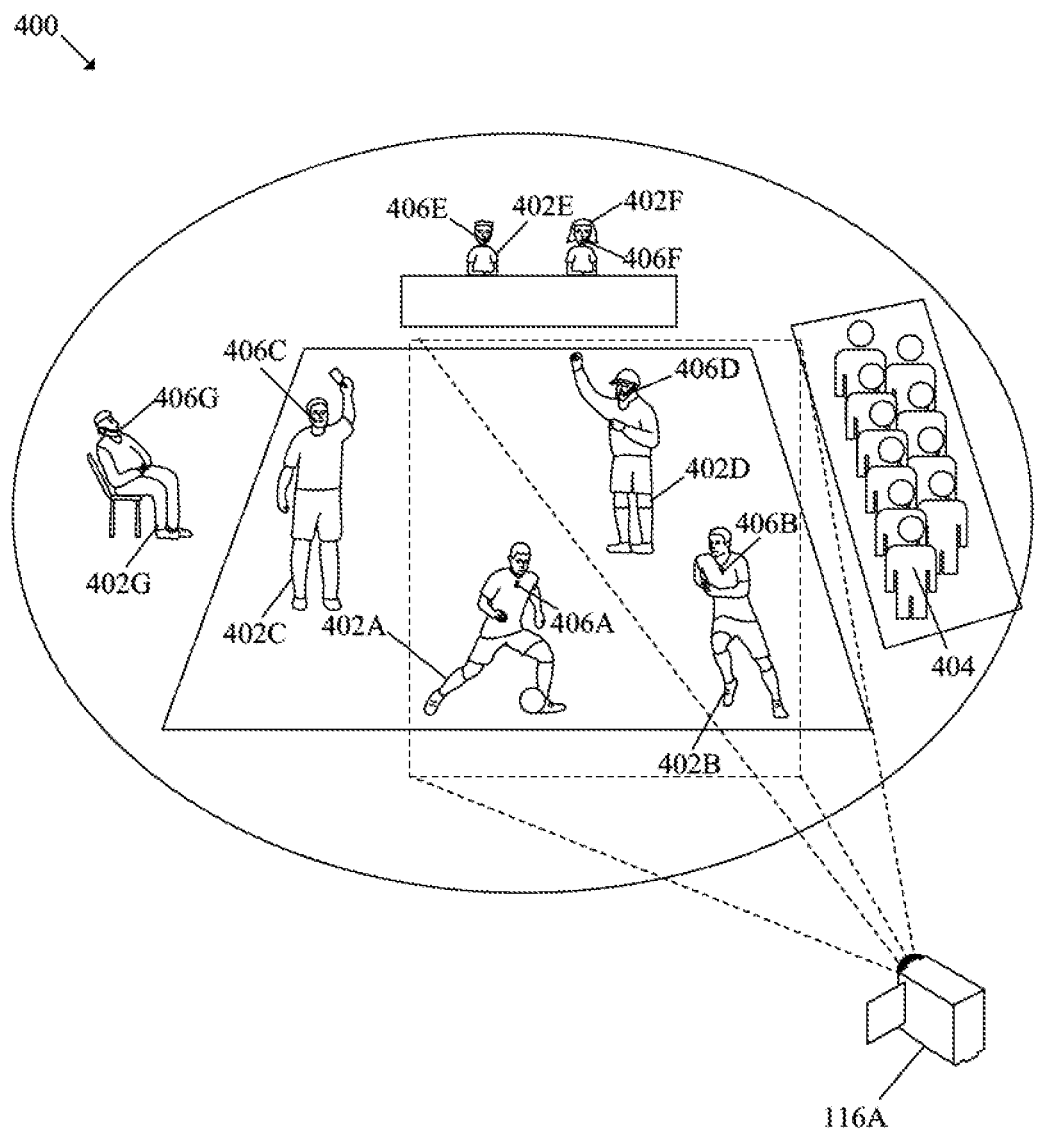
FIG. 4A illustrates an exemplary scenario for capture of a video of the live event by an image-capture device of a plurality of image-capture devices, in accordance with an embodiment of the disclosure.

FIG. 4A illustrates an exemplary scenario for capture of a video of the live event by an image-capture device of a plurality of image-capture devices, in accordance with an embodiment of the disclosure. FIG. 4A is explained in conjunction with elements from FIGS. 1, 2, and 3. With reference to FIG. 4A, there is shown a live sports event environment 400 that includes a plurality of performers-of-interest 402A, 402B, 402C, 402D, 402E, 402F, and 402G, a listener 404, and a plurality of audio-capture devices 406A, 406B, 406C, 406D, 406E, 406F, and 406G. The live sports event environment 400 may be same as the live sports event environment 300. There is further shown a first image-capture device 116A of the plurality of image-capture devices 116A, 116B . . . , and 116N that may be a part of the display system 102.

Each image-capture device of the plurality of image-capture devices 116A, 116B . . . , and 116N may be configured to capture a video of the live event. The video may be captured from different angles, perspectives, different positions in the live sports event environment 400, and/or from a different field-of-view (FOV). The video captured by each image-capture device of the plurality of image-capture devices 116A, 116B . . . , and 116N may include the plurality of performers-of-interest 402A, 402B, 402C, 402D, 402E, 402F, and 402G (e.g., a plurality of players, referees, commentators, and the like). For example, a video captured by the first image-capture device 116A may depict a first performer-of-interest 402A, a second performer-of-interest 402B, and a fourth performer-of-interest 402D. Similarly, a video captured by the second image-capture device 116B may depict a third performer-of-interest 402C and a seventh performer-of-interest 402G.

The first image-capture device 116A may be configured to capture a first video of the live event from a first FOV. The first image-capture device 116A may capture the first video of the live event that includes the first performer-of-interest 402A (such as a first player), the second performer-of-interest 402B (such as a second player), and a fourth performer-of-interest 402D (such as a fourth player). The video captured by each image-capture device of the plurality of image-capture devices 116A, 116B . . . , and 116N may be displayed on a display device, such as the display device 108 or the display screen 214A of the electronic device 106. At a particular time step, the video captured by one image-capture device of the plurality of image-capture devices 116A, 116B . . . , and 116N may be displayed on the display device 108 based on a user preference. In some embodiments, a video controller may be configured to control display of a video captured by one image-capture device of the plurality of image-capture devices 116A, 116B . . . , and 116N on the display device 108 at a particular time step.

Figure 4B:
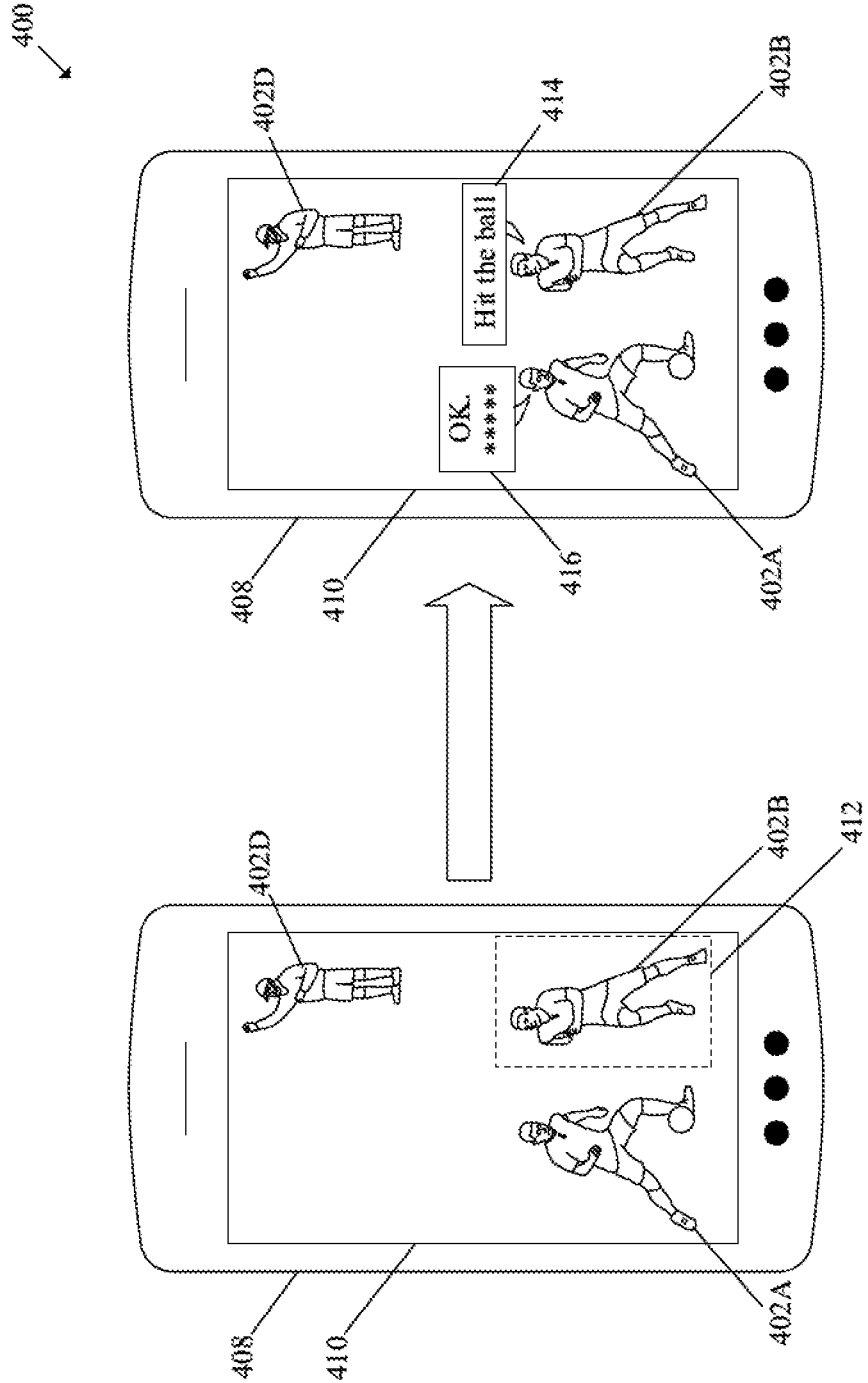
FIG. 4B illustrates an exemplary scenario for presentation of caption information of a vocal deliverance of a plurality of performers-of-interest at a live event over the captured video of the live event, in accordance with an embodiment of the disclosure.

FIG. 4B illustrates an exemplary scenario for presentation of caption information of a vocal deliverance of a plurality of performers-of-interest at a live event over the captured video of the live event, in accordance with an embodiment of the disclosure. FIG. 4B is explained in conjunction with elements from FIGS. 1, 2, 3, and 4A. With reference to FIG. 4B, there is shown a smartphone 408, an application interface 410, a first UI element 412, a first text 414, and a second text 416. There is further shown the first performer-of-interest 402A, the second performer-of-interest 402B, and the fourth performer-of-interest 404D on the application interface 410 of the smartphone 408. The smartphone 408 may correspond to the electronic device 106 and the application interface 410 may correspond to the application interface 218. The listener 404 may be associated with the smartphone 408 in the live sports event.

In accordance with an embodiment, the processor 204 may be configured to receive a user-input associated with a selection to view the second performer-of-interest 118B (e.g., the second player). The processor 204 may be further configured to control display of the first video captured by the first image-capture device 116A (as shown in FIG. 4A) on the application interface 410 of the smartphone 408. The first video captured by the first image-capture device 116A may depict the first performer-of-interest 402A (i.e. the first player), the second performer-of-interest 402B (i.e. the second player), and the fourth performer-of-interest 402D (i.e. the fourth player).

The processor 204 may be configured to receive a user-input that corresponds to a selection of the first UI element 412 from a plurality of UI elements on the application interface 410. The listener 404 may select the first UI element 412 (i.e., shown as a dotted boundary box) to view new caption information associated with the vocal deliverance of the second performer-of-interest 402B (i.e. the second player). The processor 204 may be further configured to detect the first performer-of-interest 402A (i.e. the first player) who may be within a threshold range of the second audio-capture device 406B. The second audio-capture device 406B may be attached to the second performer-of-interest 118B.

The processor 204 may be further configured to deduce new caption information (such as the new caption information 314 of FIG. 3B) from a first verbatim text. For example, the first verbatim text 312 that is common between a first audio segment 308A and the second audio segment 308B. The deduced new caption information may include the first text 414 associated with the vocal deliverance of the second performer-of-interest 402B (i.e., the second player) and the second text 416 associated with the vocal deliverance of the first performer-of-interest 402A (i.e., the first player).

As an example, the second text 416 may include a portion of text that is hidden or replaced by special symbols, such as "OK. ******" as a measure to hide words that may be inappropriate for display to the listener 404 in the audience. As another example, the listener 404 may select a UI element associated with a seventh performer-of-interest 402G who may be a special guest at the live sports event. The listener 404 may want to know comments that the special guest may provide throughout the live sports event. The special guest may be a former sports player, a celebrity guest, a special judge, and the like. In such a scenario, the processor 204 may be configured to deduce new caption information associated with a verbatim text of the vocal deliverance of the special guest and display the generated new caption information on the application interface 410.

The processor 204 may be further configured to determine a first position for the display of the deduced new caption information in the captured first video. The first position may be determined based on a position of each object of a plurality of objects in the first video of the live event. The plurality of objects of the captured first video may depict at least the plurality of performers-of-interest 402A, 402B, 402C, 402D, 402E, 402F, and 402G. The first position of the first text 414 and the second text 416 of the deduced new caption information may be determined such that the displayed first text 414 and the second text 416 doesn't overlap with the plurality of objects in the first video. The first text 414 and the second text 416 may be displayed such that the first text 414 and the second text 416 appear clearly to the listener 404 in the live sports event.

In accordance with an embodiment, the processor 204 may be further configured to overlay the first text 414 and the second text 416 at the determined first position in the first video of the live sports event. The first text 414 and the second text 416 may be overlaid at the first position such that the first text 414 and the second text 416 do not obstruct a view of the plurality of objects in the first video. The processor 204 may be further configured to control the display of the first video on the application interface 410 along with the overlaid first text 414 and the overlaid second text 416. The first text 414 and the second text 416 may be overlaid and displayed in synchronization with the received first audio segment 120A and the second audio segment 120B. The first text 414 and the second text 416 may be displayed when the second performer-of-interest 402B enunciates a second audio segment and the first performer-of-interest 402A enunciates a first audio segment in real-time or near real-time.

In accordance with another embodiment, the processor 204 may be further configured to embed the first text 414 and the second text 416 at the first position in the first video of the live event. The processor 204 may be further configured to modify the first video based on the embedded first text 414 and the second text 416. The modified first video may include the first text 414 and the second text 416 for the vocal deliverances of the second performer-of-interest 402B (i.e., the second player) and the first performer-of-interest 402A (i.e., the first player). The processor 204 may be further configured to control display of the modified first video of the live event on the application interface 410 of the smartphone 408. The modified first video that includes the first text 414 and the second text 416 may be displayed when the second performer-of-interest 118B enunciates the second audio segment and the first performer-of-interest 118A enunciates the first audio segment in real-time or near real-time.

Figure 5:
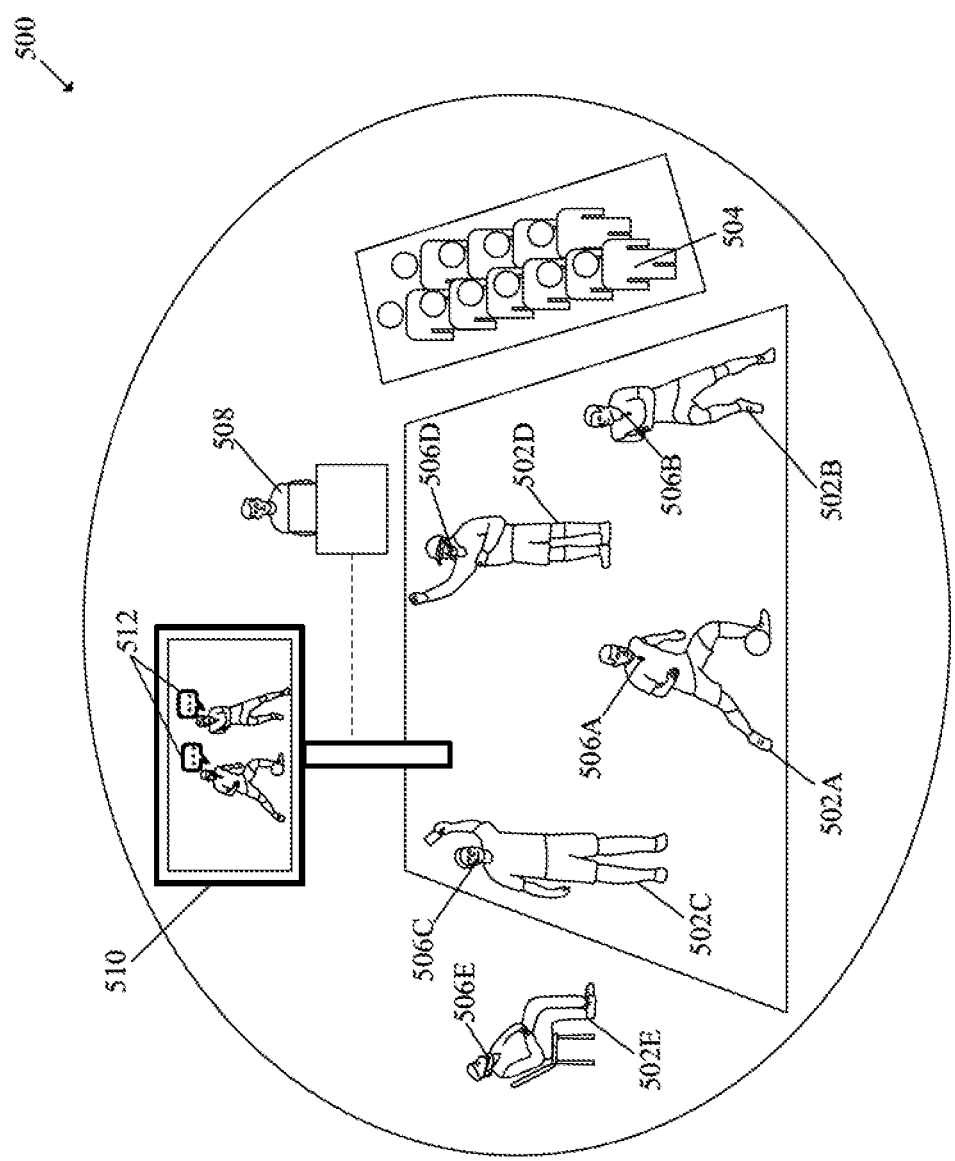
FIG. 5 illustrates a scenario for presentation of caption information on a video based on a selection of a mode from a set of modes, in accordance with an embodiment of the disclosure.

FIG. 5 illustrates a scenario for presentation of caption information on a video based on a selection of a mode from a set of modes, in accordance with an embodiment of the disclosure. FIG. 5 is explained in conjunction with elements from FIGS. 1, 2, 3, 4A and 4B. With reference to FIG. 5, there is shown a live sports event environment 500 that includes a plurality of performers-of-interest 502A, 502B, 502C, 502D, and 502E, a listener 504, and a plurality of audio-capture devices 506A, 506B, 506C, 506D, and 506E. The live sports event environment 500 may further include a video controller 508, an in-stadium display 510 as the display device 108 that displays modified caption information 512.

In accordance with an embodiment, the processor 204 may be configured to modify new caption information that may be deduced from a first verbatim text that is common between a first audio segment and a second audio segment. The first audio segment and the second audio segment may be captured from a vocal deliverance of the first performer-of-interest 502A and the second performer-of-interest 502B, respectively. The new caption information may be modified to generate the modified caption information 512. The modified caption information 512 may be generated based on a user-input associated with a selection of a mode from a set of modes associated with the display system 102. More specifically, the processor 204 may be configured to change text content of the new caption information or a display characteristic of the new caption information to generate the modified caption information 512 based on the selection of a mode from the set of modes.

As an example, the processor 204 may be configured to remove a portion of text from the new caption information to generate the modified caption information 512. As another example, the processor 204 may be configured to highlight a portion of text or replace the portion of text with particular characters (such as "*") to generate the modified caption information 512. The set of modes may include, but are not limited to, a free-view mode, a selective broadcast mode, a multi-view integrate mode, an authorized access mode, an in-event display mode, or a highlight synchronization mode.

In accordance with an embodiment, the processor 204 may be configured to receive a user-input that corresponds to a selection of a mode from the set of modes. The listener 504 may select one of the set of modes based on a user preference and a geo-location of the listener 504. For example, if the listener 504 is present at the geo-location of the live event, the listener 504 may select one of the in-event display mode, the multi-view integrate mode, or the free-view mode.

In the in-event display mode, the processor 204 may be configured to display a video and new caption information on the in-stadium display 510 that is visible to each audience member in the audience of the live event. In the multi-view integrate mode, the processor 204 may be configured to render multiple views of the live event at a given time step on the in-stadium display 510 or other display devices associated with the listener 504. The multi-view integrate mode may be utilized by the listener 504 to view multiple views of the live event at a particular time step. Similarly, in the free-view mode, the processor 204 may be configured to render an immersive view of the live event. The immersive view may be a modifiable view (such as a 360° view) based on a user-input. The free-view mode may be utilized by the listener 504 to view any view of a plurality of views of the live event on the display device 108 associated with the electronic device 106.

In accordance with an embodiment, the processor 204 may be configured to select the selective broadcast mode based on the user-input received from the listener 504. In the selective broadcast mode, the processor 204 may be configured to broadcast a video of the live event and the new caption information associated with the video to a dispersed audience in different regions around the world via the communication network 112. The content for the video of the live event and the new caption information associated with the video may be broadcasted selectively based on a relevance of the content to the dispersed audience.

In accordance with an embodiment, the processor 204 may be configured to select the authorized access mode based on the user-input received from the listener 504. In the authorized access mode, the processor 204 may be configured to authorize access to confidential content of the live event that may only be specified for select users, such as the listener 504, in the audience. The authorized access mode may be selected by the listener 504 who may be authorized to watch the confidential content of the live event. For example, in a live sports events, decisions made by the assistant off-field referees may only be viewed by some users who may be authorized to view that confidential content.

In accordance with an embodiment, the processor 204 may be configured to receive a user-input from the listener 504 associated with the selection of the in-event display mode from the set of modes. In certain scenarios, the in-event display mode of the display system 102 may be a default mode that may be utilized to display the deduced new caption information along with a video of the live event on a common display device, such as the in-stadium display 510 at the live event. In such scenarios, each listener present in the audience may be able to view the deduced new caption information along with the video of the live event on the common display device at the live event. Further, in such scenarios, each listener present in the audience may not be associated with an electronic device, such as the electronic device 106, to provide a user-input to the display system 102. The video controller 508, may provide user-inputs to the processor 204 as a listener on behalf of the audience at the live event. In response to user-inputs, the processor 204 may be configured to control the display of the video of the live event and the deduced new caption information on the in-stadium display 510.

The video controller 508 may also provide user-inputs to the display system 102 for selection of a particular performer-of-interest of the plurality of performers-of-interest 502A, 502B, 502C, 502D, and 502E. In response to the selection of the in-event display mode, the processor 204 may be configured to receive a user-input from the video controller 508 to select a performer-of-interest from the plurality of performers-of-interest 502A, 502B, 502C, 502D, and 502E in the live sports event environment 500. For example, the video controller 508 may provide user-inputs to the processor 204 to select the second performer-of-interest 502B (i.e. the second player) and control a display of the first video captured by a first image-capture device (such as the first image-capture device 116A). The first video may depict the second performer-of-interest 502B on the in-stadium display 510.

The processor 204 may be configured to generate the modified caption information 512 based on a modification to the new caption information based on the selection of the in-event display mode. The new caption information may be modified such that the modified caption information 512 is appropriate to be viewed by each listener in the audience. The information content in the modified caption information 512 may be less than that of the new caption information deduced from the first verbatim text associated with a conversation between the first performer-of-interest 502A and the second performer-of-interest 502B of the plurality of performers-of-interest 502A, 502B, 502C, 502D, and 502E.

In accordance with an embodiment, the processor 204 may be configured to receive a user-input for a selection of a portion of the video of the live event to be displayed to a dispersed audience in different regions. The user-input for the selection of the portion of the video of the live event may be provided by the video controller 508. The processor 204 may be further configured to receive another user-input for a selection of a performer-of-interest from the plurality of performers-of-interest 502A, 502B, 502C, 502D, and 502E. Another user-input for the selection of the performer-of-interest may also be provided by the video controller 508. Also, the processor 204 may be configured to broadcast the deduced new caption information associated with the vocal deliverance of the selected performer-of-interest and display on a plurality of electronic devices associated with the dispersed audience in different regions.

Figure 6:
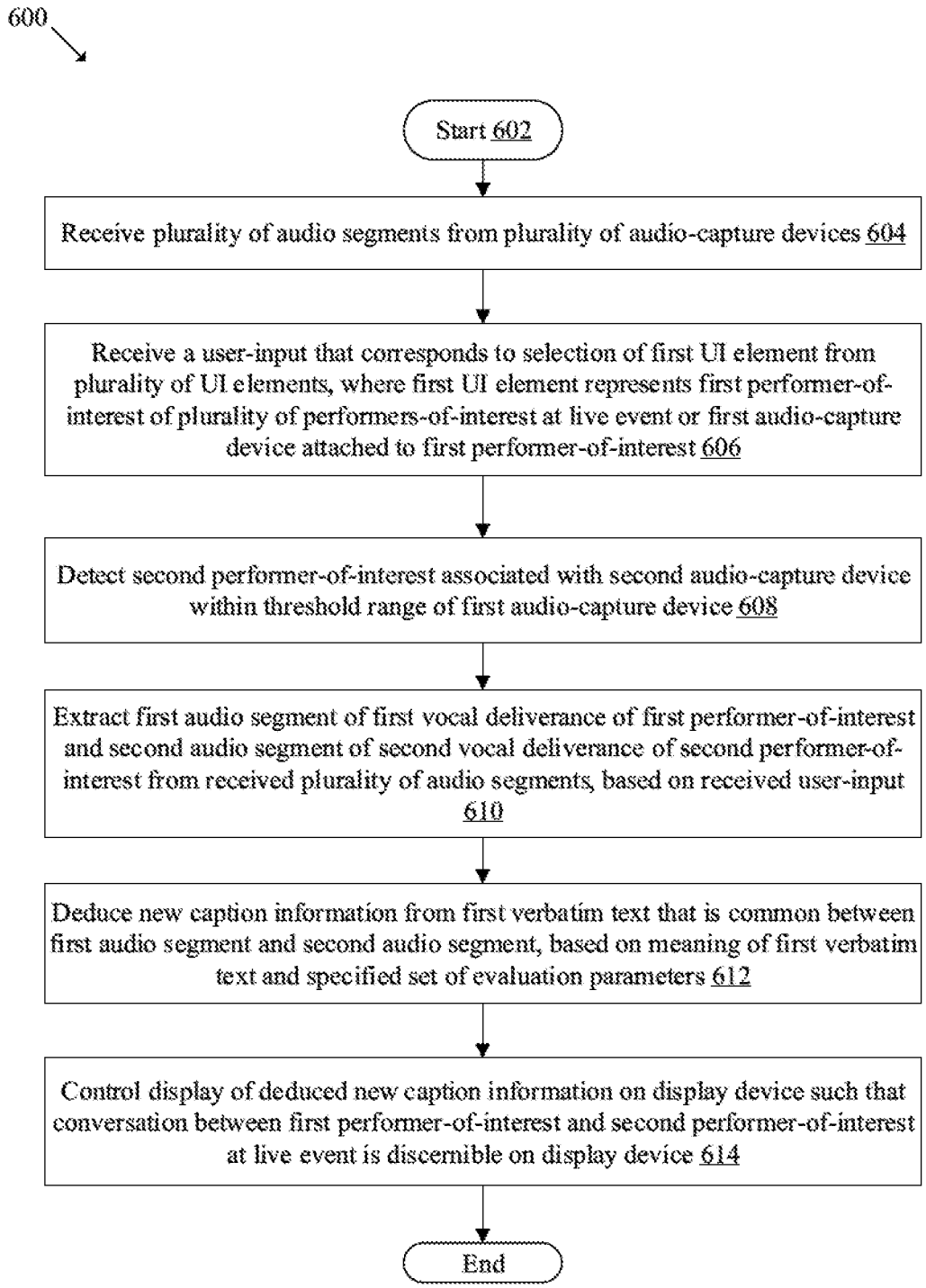
FIG. 6 is a flowchart that illustrates exemplary operations for display control of different verbatim text of a vocal deliverance of a performer-of-interest in a live event, in accordance with an embodiment of the disclosure.

FIG. 6 is a flowchart that illustrates exemplary operations for display control of different verbatim text of a vocal deliverance of a performer-of-interest in a live event, in accordance with an embodiment of the disclosure. With reference to FIG. 6, there is shown a flowchart 600. The flowchart 600 is described in conjunction with FIGS. 1, 2, 3, 4A, 4B, and 5. The operations 604 through 614 may be implemented in the display system 102. The operations of the flowchart 600 may start at 602 and proceed to 604.

At 604, the plurality of audio segments 120A, 120B . . . , and 120N may be received from the plurality of audio-capture devices 114A, 114B . . . , and 114N. The circuitry 202 may be configured to receive the plurality of audio segments 120A, 120B . . . , and 120N from the plurality of audio-capture devices 114A, 114B . . . , and 114N. The plurality of audio-capture devices 114A, 114B . . . , and 114N may be configured to record vocal deliverance of the plurality of performers-of-interest 118A, 118B . . . , and 118N at a live event. For example, the plurality of audio-capture devices 114A, 114B . . . , and 114N may be configured to record vocal deliverance of a plurality of players, referees, or other subjects at a live sports event.

At 606, a user-input that corresponds to a selection of the first UI element 110A from the plurality of UI elements 110 may be received. The first UI element 110A may represent the first performer-of-interest 118A of the plurality of performers-of-interest 118A, 118B . . . , and 118N at the live event or the first audio-capture device 112A attached to the first performer-of-interest 118A. The circuitry 202 may be configured to receive the user-input that corresponds to the selection of the first UI element 110A from a user, such as the listener 122, in the audience in the live event.

At 608, the second performer-of-interest 118B associated with the second audio-capture device 112B may be detected within a threshold range of the first audio-capture device 112A. The circuitry 202 may be configured to detect the second performer-of-interest 118B associated with the second audio-capture device 112B, based on a geo-location of the first audio-capture device 112A and the second audio-capture device 112B, and the received user-input. For example, the first performer-of-interest 118A may be engaged in a conversation with the second performer-of-interest 118B in the live event and the second performer-of-interest 118B may be in vicinity of the first performer-of-interest 118A, as shown and described in FIG. 3.

At 610, the first audio segment 120A of a first vocal deliverance of the first performer-of-interest 118A and the second audio segment 120B of a second vocal deliverance of the second performer-of-interest 118B may be extracted from the received plurality of audio segments 120A, 120B . . . , and 120N, based on the received user-input. The circuitry 202 may be configured to extract the first audio segment 120A of the first vocal deliverance of the first performer-of-interest 118A and the second audio segment 120B of a second vocal deliverance of the second performer-of-interest 118B. The extraction of the first audio segment 120A and the second audio segment 120B has been described, for example, in FIG. 3.

At 612, new caption information may be deduced from a first verbatim text that is common between the first audio segment 120A and the second audio segment 120B, based on a meaning of a first verbatim text and a specified set of evaluation parameters. The circuitry 202 may be configured to deduce the new caption information from the first verbatim text. The new caption information may be deduced to be appropriate to be shown to an audience in the live event. The deduction of the new caption information described, for example, in FIG. 3.

At 614, display of the deduced new caption information may be controlled on the display device 108 such that a conversation between the first performer-of-interest 118A and the second performer-of-interest 118B at the live event is discernible on the display device 108. The circuitry 202 may be configured to control the display of the deduced new caption information 306 on the display device 108 (or the display screen 214A of the electronic device 106) such that the listener 122 in the audience at the live event may be able to view the conversation between the selected first performer-of-interest 118A and the detected second performer-of-interest 118B. The new caption information may be displayed on the display device 108 when the first performer-of-interest 118A and the second performer-of-interest 118B enunciate the first audio segment 120A and the second audio segment 120B in the live event in real-time or near real-time. The display control of the new caption information 306 has been described, for example, in FIGS. 3, 4A, and 4B. Control may pass to end.

Various embodiments of the disclosure may provide a non-transitory, computer-readable medium and/or storage medium, and/or a non-transitory machine readable medium and/or storage medium stored thereon, instructions executable by a machine and/or a computer that comprises one or more circuits. The instructions may be executable by the machine and/or the computer to perform the operations that may include reception of a plurality of audio segments from a plurality of audio-capture devices. The plurality of audio-capture devices may record vocal deliverance of a plurality of performers-of-interest at a live event. The operations may further include reception of a user-input that corresponds to selection of a first user interface (UI) element from a plurality of UI elements. The first UI element may represent a first performer-of-interest of the plurality of performers-of-interest at the live event or a first audio-capture device attached to the first performer-of-interest. The operations may further include a detection of a second performer-of-interest of the plurality of performers-of-interest. The second performer-of-interest may be associated with a second audio-capture device within a threshold range of the first audio-capture device. The second performer-of-interest may be detected based on a geo-location of the first audio-capture device and the second audio-capture device and the received user-input. The operations may further include extraction of a first audio segment of a first vocal deliverance of the first performer-of-interest and a second audio segment of a second vocal deliverance of the second performer-of-interest from the received plurality of audio segments, based on the received user-input. The operations may further include deduction of new caption information from a first verbatim text that is common between the first audio segment and the second audio segment, based on a meaning of the first verbatim text and a specified set of evaluation parameters. The operations may further include control of display of the deduced new caption information on the display device such that a conversation between the first performer-of-interest and the second performer-of-interest at the live event is discernible on the display device.

Exemplary aspects of the disclosure may include the display system 102 that includes the display device 108 and the circuitry 202 in the server 104. The circuitry 202 may be configured to receive the plurality of audio segments 120A, 120B . . . , and 120N from the plurality of audio-capture devices 114A, 114B . . . , and 114N. The plurality of audio-capture devices 114A, 114B . . . , and 114N may be configured to record vocal deliverance of the plurality of performers-of-interest 118A, 118B . . . , and 118N at a live event. The circuitry 202 may be further configured to receive a user-input that corresponds to a selection of the first user interface (UI) element 110A from the plurality of UI elements 110. The first UI element 110A may represent the first performer-of-interest 118A of the plurality of performers-of-interest 118A, 118B . . . , and 118N at the live event or the first audio-capture device 114A attached to the first performer-of-interest 118A.

The circuitry 202 may be further configured to detect the second performer-of-interest 118B of the plurality of performers-of-interest 118A, 118B . . . , and 118N. The second performer-of-interest 118B may be associated with the second audio-capture device 114B within a threshold range of the first audio-capture device 114A. The second performer-of-interest 118B may be detected, based on a geo-location of the first audio-capture device 114A and the second audio-capture device 114B and the received user-input. The circuitry 202 may be further configured to extract the first audio segment 120A of a first vocal deliverance of the first performer-of-interest 118A and the second audio segment 120B of a second vocal deliverance of the second performer-of-interest 118B from the received plurality of audio segments 120A, 120B . . . , and 120N, based on the received user-input. The circuitry 202 may be further configured to deduce new caption information 314 from the first verbatim text 312 that is common between the first audio segment 120A and the second audio segment 120B, based on a meaning of the first verbatim text 312 and a specified set of evaluation parameters. The circuitry 202 may be further configured to control display of the deduced new caption information 314 on the display device 108 such that a conversation between the first performer-of-interest 118A and the second performer-of-interest 118B at the live event is discernible on the display device 108.

In accordance with an embodiment, the circuitry 202 may be further configured to identify a user-type of each performer-of-interest of the plurality of performers-of-interest 118A, 118B . . . , and 118N. At least one audio-capture device of the plurality of audio-capture devices 114A, 114B . . . , and 114N may be attached to each performer-of-interest of the plurality of performers-of-interest 118A, 118B . . . , and 118N. The circuitry 202 may be further configured to determine an interaction-type between the first performer-of-interest 118A and the second performer-of-interest 118B from the first verbatim text 312, based on the identified user-type of the first performer-of-interest 118A and the second performer-of-interest 118B. The new caption information 314 may be deduced further based on the determined interaction-type. The circuitry 202 may be further configured to link the first UI element 110A to the first audio-capture device 114A attached to the first performer-of-interest 118A and the second audio-capture device 114B attached to the detected second performer-of-interest 118B within the threshold range of the first audio-capture device 114A.

In accordance with an embodiment, the circuitry 202 may be further configured to determine the meaning of the first verbatim text 312, based on a plurality of audio parameters. The plurality of audio parameters includes at least one of a meaning of each word of the plurality of words of the first verbatim text 312, a context parameter, a pitch parameter, a loudness parameter, an intonation parameter, or a tone parameter. The plurality of audio parameters may further include a rate-of-speech parameter, an intensity of overtones, a voice modulation parameter, a phonetic parameter, a pronunciation parameter, a prosody parameter, or one or more psychoacoustic parameters. The circuitry 202 may be further configured to store the specified set of evaluation parameters at the server 104. The set of evaluation parameters may include at least one of a type of the live event, a current time of the live event, or a profile of each performer-of-interest of the plurality of performers-of-interest 118A, 118B . . . , and 118N. The set of evaluation parameters may further include a user-type of each performer-of-interest of the plurality of performers-of-interest 118A, 118B . . . , and 118N, a priority information associated with each performer-of-interest of the plurality of performers-of-interest 118A, 118B . . . , and 118N, a or a geo-location of the live-event.

In accordance with an embodiment, the display system 102 may further include the image-capture devices 116A, 116B . . . , and 116N configured to capture a video of the live event. The captured video may include each of the plurality of performers-of-interest 118A, 118B . . . , and 118N at the live event. Each image-capture device of the plurality of image-capture devices 116A, 116B . . . , and 116N may be configured to capture the video of the live event from a different field-of-view (FOV). The circuitry 202 may be further configured to determine a first position for the display of the deduced new caption information 314 in the captured video, based on a position of each object of a plurality of objects in the video of the live event. The plurality of objects may include the plurality of performers-of-interest 118A, 118B . . . , and 118N. The circuitry 202 may be further configured to overlay the deduced new caption information 314 at the first position on the video of the live event. The overlaid new caption information 314 may be in synchronization with the received plurality of audio segments 120A, 120B . . . , and 120N and the video of the live event. The circuitry 202 may be further configured to control display of the video of the live event with the overlaid new caption information on the display device 108.

In accordance with an embodiment, the circuitry 202 may be further configured to embed the deduced new caption information 314 at the first position in the video of the live event. The circuitry 202 may be further configured to modify the video of the live event based on the embedded new caption information 314. The circuitry 202 may be further configured to control display of the modified video of the live event that comprises the embedded new caption information 314 on the display device 108. The deduced new caption information may include at least a first text associated with the vocal deliverance of the first performer-of-interest 118A and a second text associated with the vocal deliverance of the second performer-of-interest 118B. The circuitry 202 may be further configured to modify the deduced new caption information 314 based on a user-input associated with a selection of a mode from a set of modes associated with the display system 102. The set of modes may include at least one of a free-view mode, a selective broadcast mode, a multi-view integrate mode, an authorized access mode, an in-event display mode, or a highlight synchronization mode. In accordance with an embodiment, the display system 102 may further include a speaker (such as the speaker 214B). The circuitry 202 may be further configured to control a playback of the extracted first audio segment 120A and the second audio segment 120B via the speaker 214B in synchronization with the display of the deduced new caption information 314 on the display device 108.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. A display system, comprising:
a display device; and
a server that comprises circuitry configured to:
receive a plurality of audio segments from a plurality of audio-capture devices, wherein the plurality of audio-capture devices records vocal deliverance of a plurality of performers-of-interest at a live event;
receive a user-input that corresponds to a selection of a first user interface (UI) element from a plurality of UI elements, wherein the first UI element represents a first performer-of-interest of the plurality of performers-of-interest at the live event or a first audio-capture device attached to the first performer-of-interest;
detect a second performer-of-interest of the plurality of performers-of-interest, wherein the second performer-of-interest is associated with a second audio-capture device within a threshold range of the first audio-capture device, based on a geo-location of the first audio-capture device and the second audio-capture device and the received user-input;
extract a first audio segment of a first vocal deliverance of the first performer-of-interest and a second audio segment of a second vocal deliverance of the second performer-of-interest from the received plurality of audio segments, based on the received user-input;
deduce new caption information from a first verbatim text that is common between the first audio segment and the second audio segment, based on a meaning of the first verbatim text and a specified set of evaluation parameters; and
control display of the deduced new caption information on the display device such that a conversation between the first performer-of-interest and the second performer-of-interest at the live event is discernible on the display device.

2. The display system according to claim 1, wherein the circuitry is further configured to identify a user-type of each performer-of-interest of the plurality of performers-of-interest, and wherein at least one audio-capture device of the plurality of audio-capture devices is attached to each performer-of-interest of the plurality of performers-of-interest.

3. The display system according to claim 2, wherein the circuitry is further configured to determine an interaction-type between the first performer-of-interest and the second performer-of-interest from the first verbatim text, based on the identified user-type of the first performer-of-interest and the second performer-of-interest, and wherein the new caption information is deduced further based on the determined interaction-type.

4. The display system according to claim 1, wherein the circuitry is further configured to link the first UI element to the first audio-capture device attached to the first performer-of-interest and the second audio-capture device attached to the detected second performer-of-interest within the threshold range of the first audio-capture device.

5. The display system according to claim 1, wherein the circuitry is further configured to determine the meaning of the first verbatim text, based on a plurality of audio parameters that comprises at least one of a meaning of each word of a plurality of words of the first verbatim text, a context parameter, a pitch parameter, a loudness parameter, an intonation parameter, a tone parameter, a rate-of-speech parameter, an intensity of overtones, a voice modulation parameter, a phonetic parameter, a pronunciation parameter, a prosody parameter, or one or more psychoacoustic parameters.

6. The display system according to claim 1, wherein the circuitry is further configured to store the specified set of evaluation parameters at the server, and wherein the specified set of evaluation parameters comprises at least one of a type of the live event, a current time of the live event, a profile of each performer-of-interest of the plurality of performers-of-interest, a user-type of each performer-of-interest of the plurality of performers-of-interest, a priority information associated with each performer-of-interest of the plurality of performers-of-interest, or a geo-location of the live event.

7. The display system according to claim 1, further comprising a plurality of image-capture devices configured to capture a video of the live event, wherein the captured video comprises each of the plurality of performers-of-interest at the live event, and wherein each image-capture device of the plurality of image-capture devices is configured to capture the video of the live event from a different field-of-view (FOV).

8. The display system according to claim 7, wherein the circuitry is further configured to determine a first position for the display of the deduced new caption information in the captured video, based on a position of each object of a plurality of objects in the video of the live event, and wherein the plurality of objects comprises the plurality of performers-of-interest.

9. The display system according to claim 8, wherein the circuitry is further configured to:
overlay the deduced new caption information at the first position on the video of the live event, wherein the overlaid new caption information is in synchronization with the received plurality of audio segments and the video of the live event; and
control display of the video of the live event with the overlaid new caption information on the display device.

10. The display system according to claim 8, wherein the circuitry is further configured to:
embed the deduced new caption information at the first position in the video of the live event;
modify the video of the live event based on the embedded new caption information; and
control display of the modified video of the live event that comprises the embedded new caption information on the display device.

11. The display system according to claim 1, wherein the deduced new caption information comprises at least a first text associated with the vocal deliverance of the first performer-of-interest and a second text associated with the vocal deliverance of the second performer-of-interest.

12. The display system according to claim 1, wherein the circuitry is further configured to modify the deduced new caption information based on a user-input associated with a selection of a mode from a set of modes associated with the display system, and wherein the set of modes comprises at least one of a free-view mode, a selective broadcast mode, a multi-view integrate mode, an authorized access mode, an in-event display mode, or a highlight synchronization mode.

13. The display system according to claim 1, further comprising a speaker, wherein the circuitry is further configured to control a playback of the extracted first audio segment and the second audio segment via the speaker in synchronization with the display of the deduced new caption information on the display device.

14. A method, comprising:
in a display system:
receiving a plurality of audio segments from a plurality of audio-capture devices, wherein the plurality of audio-capture devices records vocal deliverance of a plurality of performers-of-interest at a live event;
receiving a user-input that corresponds to a selection of a first user interface (UI) element from a plurality of UI elements, wherein the first UI element represents a first performer-of-interest of the plurality of performers-of-interest at the live event or a first audio-capture device attached to the first performer-of-interest;
detecting a second performer-of-interest of the plurality of performers-of-interest, wherein the second performer-of-interest is associated with a second audio-capture device within a threshold range of the first audio-capture device, based on a geo-location of the first audio-capture device and the second audio-capture device and the received user-input;
extracting a first audio segment of a first vocal deliverance of the first performer-of-interest and a second audio segment of a second vocal deliverance of the second performer-of-interest from the received plurality of audio segments, based on the received user-input;
deducing new caption information from a first verbatim text that is common between the first audio segment and the second audio segment, based on a meaning of the first verbatim text and a specified set of evaluation parameters; and
controlling display of the deduced new caption information on a display device such that a conversation between the first performer-of-interest and the second performer-of-interest at the live event is discernible on the display device.

15. The method according to claim 14, further comprising identifying a user-type of each performer-of-interest of the plurality of performers-of-interest, wherein at least one audio-capture device of the plurality of audio-capture devices is attached to each performer-of-interest of the plurality of performers-of-interest.

16. The method according to claim 15, further comprising determining an interaction-type between the first performer-of-interest and the second performer-of-interest from the first verbatim text, based on the identified user-type of the first performer-of-interest and the second performer-of-interest, wherein the new caption information is deduced further based on the determined interaction-type.

17. The method according to claim 14, further comprising linking the first UI element to the first audio-capture device attached to the first performer-of-interest and the second audio-capture device attached to the detected second performer-of-interest within the threshold range of the first audio-capture device.

18. The method according to claim 14, further comprising determining the meaning of the first verbatim text, based on a plurality of audio parameters that comprises at least one of a meaning of each word of a plurality of words of the first verbatim text, a context parameter, a pitch parameter, a loudness parameter, an intonation parameter, a tone parameter, a rate-of-speech parameter, an intensity of overtones, a voice modulation parameter, a phonetic parameter, a pronunciation parameter, a prosody parameter, or one or more psychoacoustic parameters.

19. The method according to claim 14, further comprising storing the specified set of evaluation parameters on a server, wherein the specified set of evaluation parameters comprises at least one of a type of the live event, a current time of the live event, a profile of each performer-of-interest of the plurality of performers-of-interest, a user-type of each performer-of-interest of the plurality of performers-of-interest, a priority information associated with each performer-of-interest of the plurality of performers-of-interest, or a geo-location of the live event.

20. A non-transitory computer-readable medium having stored thereon, computer-executable instructions which, when executed by a display system, cause the display system to execute operations, the operations comprising:
receiving a plurality of audio segments from a plurality of audio-capture devices, wherein the plurality of audio-capture devices records vocal deliverance of a plurality of performers-of-interest at a live event;
receiving a user-input that corresponds to a selection of a first user interface (UI) element from a plurality of UI elements, wherein the first UI element represents a first performers-of-interest of the plurality of performer-of-interest at the live event or a first audio-capture device attached to the first performer-of-interest;
detecting a second performer-of-interest of the plurality of performers-of-interest, wherein the second performer-of-interest is associated with a second audio-capture device within a threshold range of the first audio-capture device, based on a geo-location of the first audio-capture device and the second audio-capture device and the received user-input;
extracting a first audio segment of a first vocal deliverance of the first performer-of-interest and a second audio segment of a second vocal deliverance of the second performer-of-interest from the received plurality of audio segments, based on the received user-input;
deducing new caption information from a first verbatim text that is common between the first audio segment and the second audio segment, based on a meaning of the first verbatim text and a specified set of evaluation parameters; and
controlling display of the deduced new caption information on a display device such that a conversation between the first performer-of-interest and the second performer-of-interest at the live event is discernible on the display device.

\* \* \* \* \*